(12) United States Patent
Yamamoto et al.

(10) Patent No.: US 7,457,942 B2
(45) Date of Patent: Nov. 25, 2008

(54) PC CARD CONTROL DEVICE, COMPUTER SYSTEM USING THE PC CARD CONTROL DEVICE, AND PC CARD IDENTIFYING METHOD

(75) Inventors: Hitoshi Yamamoto, Hyogo-ken (JP); Hiromasa Kusakabe, Kawanishi (JP)

(73) Assignee: Ricoh Company, Ltd., Tokyo (JP)

( * ) Notice: Subject to any disclaimer, the term of this patent is extended or adjusted under 35 U.S.C. 154(b) by 917 days.

(21) Appl. No.: 10/664,386

(22) Filed: Sep. 18, 2003

(65) Prior Publication Data

US 2004/0133712 A1 Jul. 8, 2004

(30) Foreign Application Priority Data

Sep. 17, 2002 (JP) .............................. 2002-269935

(51) Int. Cl.
*G06F 9/00* (2006.01)
(52) U.S. Cl. ................................ 713/1; 713/191; 380/2; 710/3; 710/13
(58) Field of Classification Search .................... 380/2; 713/1, 191, 194; 710/313, 8, 104, 3, 13; 726/34; 439/147, 154, 681
See application file for complete search history.

(56) References Cited

U.S. PATENT DOCUMENTS

| | | | | |
|---|---|---|---|---|
| 5,291,189 | A | 3/1994 | Otake et al. | 340/779 |
| 5,515,482 | A | 5/1996 | Yamamoto et al. | 395/119 |
| 5,664,078 | A | 9/1997 | Yamamoto et al. | 345/421 |
| 5,771,046 | A | 6/1998 | Izawa et al. | 345/429 |
| 5,895,502 | A | 4/1999 | Yamamoto | 711/219 |

(Continued)

FOREIGN PATENT DOCUMENTS

CN    1196513    10/1998

(Continued)

OTHER PUBLICATIONS

U.S. Appl. No. 10/067,481 of Yamamoto et al., filed Feb. 5, 2002.

(Continued)

*Primary Examiner*—Emmanuel L Moise
*Assistant Examiner*—Paul Callahan
(74) *Attorney, Agent, or Firm*—Cooper & Dunham LLP

(57) ABSTRACT

A PC card control device includes a PC card identifying part configured to identify a type of a card connected with the connector. An identification information acquisition part of the PC card identifying part acquires identification information of the connected card from the connected card with a method conforming to a standard. A first recording part records pieces of first card information and pieces of first identification information of one or more types of PC cards conforming to the standard, and a second recording part records pieces of second card information and pieces of second identification of one or more types of expansion cards not conforming to the standard. The PC card identifying part identifies the type of the connected card based upon the identification information of the connected card acquired by the identification information acquisition part and at least the pieces of second identification information recorded in the second recording part, and to output a result of identifying the type of the connected card and card information of the connected card.

45 Claims, 23 Drawing Sheets

U.S. PATENT DOCUMENTS

| | | | |
|---|---|---|---|
| 5,982,398 A | 11/1999 | Yamamoto | 345/429 |
| 6,085,268 A | 7/2000 | Lee et al. | 710/72 |
| 6,232,986 B1 | 5/2001 | Yamamoto | 345/421 |
| 6,470,284 B1 * | 10/2002 | Oh et al. | 702/64 |
| 6,807,597 B2 * | 10/2004 | Oh et al. | 710/301 |
| 7,076,589 B2 * | 7/2006 | Oh et al. | 710/300 |

FOREIGN PATENT DOCUMENTS

| | | |
|---|---|---|
| JP | 2001075746 | 3/2001 |
| JP | 2002-251367 | 9/2002 |

OTHER PUBLICATIONS

U.S. Appl. No. 10/282,728, of Yamamoto et al., filed Oct. 29, 2002.

* cited by examiner

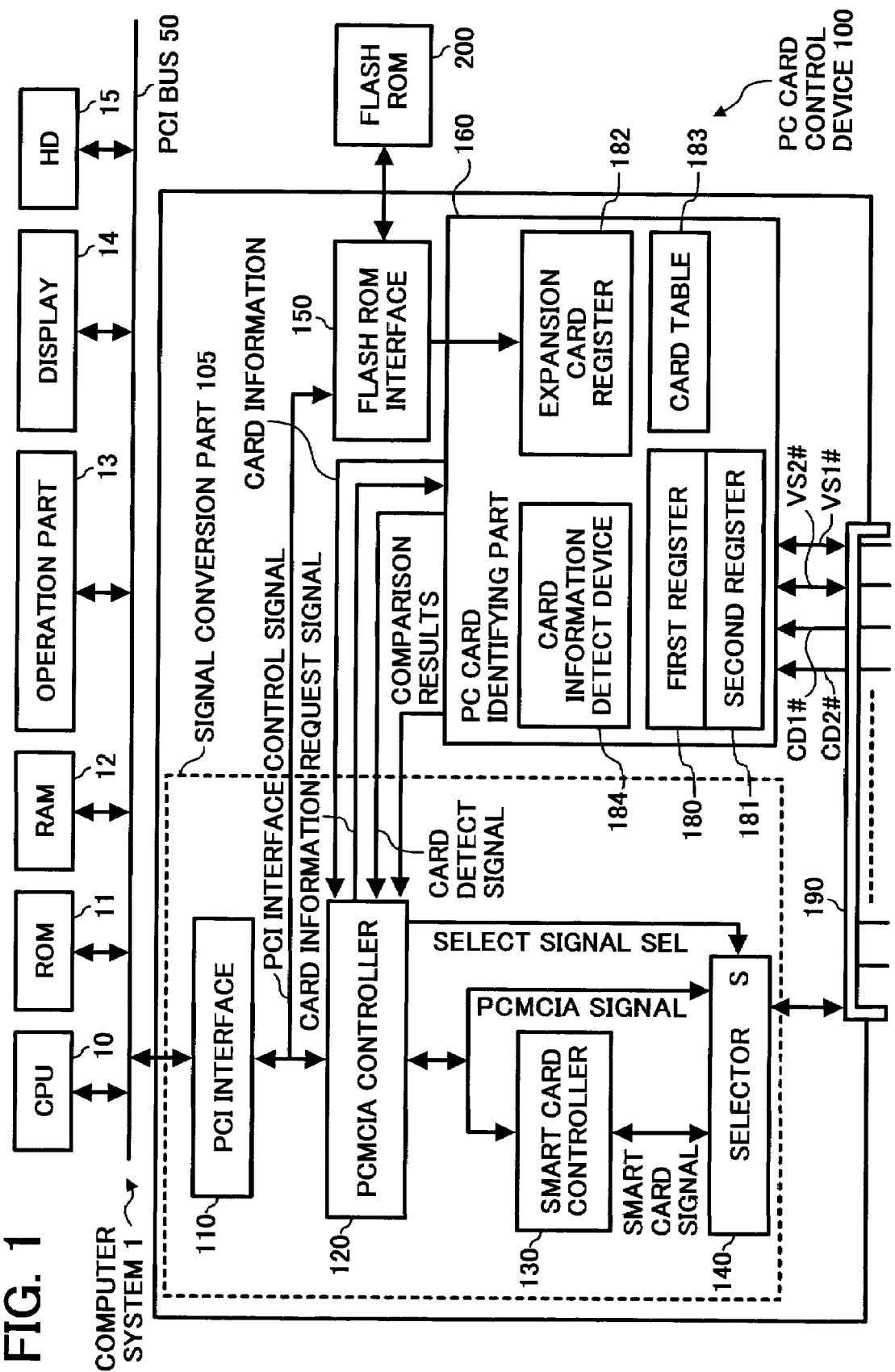

FIG. 5A

| NO. | CD2# FLOWING SECOND CONNECT HOLE | CD1# FLOWING FIRST CONNECT HOLE | VS2# FLOWING FOURTH CONNECT HOLE |
|---|---|---|---|
| 1 | GROUNDED | GROUNDED | GROUNDED |
| 2 | GROUNDED | GROUNDED | GROUNDED |
| 3 | GROUNDED | GROUNDED | OPENED |
| 4 | GROUNDED | GROUNDED | OPENED |
| 5 | GROUNDED | CONNECTED WITH THIRD CONNECT HOLE | GROUNDED |
| 6 | GROUNDED | CONNECTED WITH THIRD CONNECT HOLE | OPENED |

FIG. 5

| FIG. 5A | FIG. 5B |
|---|---|
| FIG. 5C | FIG. 5D |

FIG. 5B

| VS1# FLOWING THIRD CONNECT HOLE | TYPE OF CARD | | FIRST REGISTER STATE | SECOND REGISTER STATE |
|---|---|---|---|---|
| | INTERFACE | DRIVING VOLTAGE V | | |
| GROUNDED | 16BIT | 5V, 3.3V, X. XV | 0000 | 0000 |
| OPENED | 16BIT | X. XV | 0001 | 0000 |
| GROUNDED | 16BIT | 5V, 3.3V | 0000 | 0010 |
| OPENED | 16BIT | 5V | 0001 | 0010 |
| CONNECTED WITH FIRST CONNECT HOLE | RESERVED | | 0101 | 0000 |
| CONNECTED WITH FIRST CONNECT HOLE | CARDBUS | 3.3V | 0101 | 0010 |

FIG. 5C

| | | | |
|---|---|---|---|
| 7 | CONNECTED WITH FOURTH CONNECT HOLE | GROUNDED | CONNECTED WITH SECOND CONNECT HOLE |
| 8 | CONNECTED WITH FOURTH CONNECT HOLE | GROUNDED | CONNECTED WITH SECOND CONNECT HOLE |
| 9 | GROUNDED | CONNECTED WITH FOURTH CONNECT HOLE | CONNECTED WITH FIRST CONNECT HOLE |
| 10 | GROUNDED | CONNECTED WITH FOURTH CONNECT HOLE | CONNECTED WITH FIRST CONNECT HOLE |
| 11 | CONNECTED WITH THIRD CONNECT HOLE | GROUNDED | GROUNDED |
| 12 | CONNECTED WITH THIRD CONNECT HOLE | GROUNDED | OPENED |

FIG. 5D

| | | | | |
|---|---|---|---|---|
| GROUNDED | CARDBUS | 3.3V, X, XV | 0000 | 1010 |
| OPENED | CARDBUS | X, XV | 0001 | 1010 |
| GROUNDED | RESERVED | | 0000 | 0110 |
| OPENED | CARDBUS | X, XV, Y, YV | 0001 | 0110 |
| CONNECTED WITH SECOND CONNECT HOLE | CARDBUS | 3.3V, X, XV Y, YV | 1001 | 0000 |
| CONNECTED WITH SECOND CONNECT HOLE | CARDBUS | Y, YV | 1001 | 0010 |

FIG. 6A

| NO. | CD2# FLOWING SECOND CONNECT HOLE | CD1# FLOWING FIRST CONNECT HOLE | VS2# FLOWING FOURTH CONNECT HOLE |
|---|---|---|---|
| 1 | CONNECTED WITH FOURTH CONNECT HOLE | CONNECTED WITH THIRD CONNECT HOLE | CONNECTED WITH SECOND CONNECT HOLE |
| 2 | CONNECTED WITH THIRD CONNECT HOLE | CONNECTED WITH FOURTH CONNECT HOLE | CONNECTED WITH FIRST CONNECT HOLE |
| 3 | CONNECTED WITH THIRD CONNECT HOLE | CONNECTED WITH THIRD CONNECT HOLE | GROUNDED |
| 4 | CONNECTED WITH THIRD CONNECT HOLE | CONNECTED WITH THIRD CONNECT HOLE | OPENED |
| 5 | CONNECTED WITH FOURTH CONNECT HOLE | CONNECTED WITH FOURTH CONNECT HOLE | CONNECTED WITH FIRST AND SECOND CONNECT HOLES |
| 6 | CONNECTED WITH FOURTH CONNECT HOLE | CONNECTED WITH FOURTH CONNECT HOLE | CONNECTED WITH FIRST AND SECOND CONNECT HOLES |

FIG. 6

| FIG. 6A |
|---|
| FIG. 6B |

FIG. 6B

| VS1# FLOWING THIRD CONNECT HOLE | TYPE OF CARD | | FIRST REGISTER STATE | SECOND REGISTER STATE |
|---|---|---|---|---|
| | INTERFACE | DRIVING VOLTAGE V | | |
| CONNECTED WITH FIRST CONNECT HOLE | NEW TYPE NO. 1 | | 0101 | 1010 |
| CONNECTED WITH SECOND CONNECT HOLE | NEW TYPE NO. 2 | | 1001 | 0110 |
| CONNECTED WITH FIRST AND SECOND CONNECT HOLES | NEW TYPE NO. 3 | | 1101 | 0000 |
| CONNECTED WITH FIRST AND SECOND CONNECT HOLES | NEW TYPE NO. 4 | | 1101 | 0010 |
| GROUNDED | NEW TYPE NO. 5 | | 0000 | 1110 |
| OPENED | NEW TYPE NO. 6 | | 0001 | 1110 |

| FIG. 7A |
| FIG. 7B |

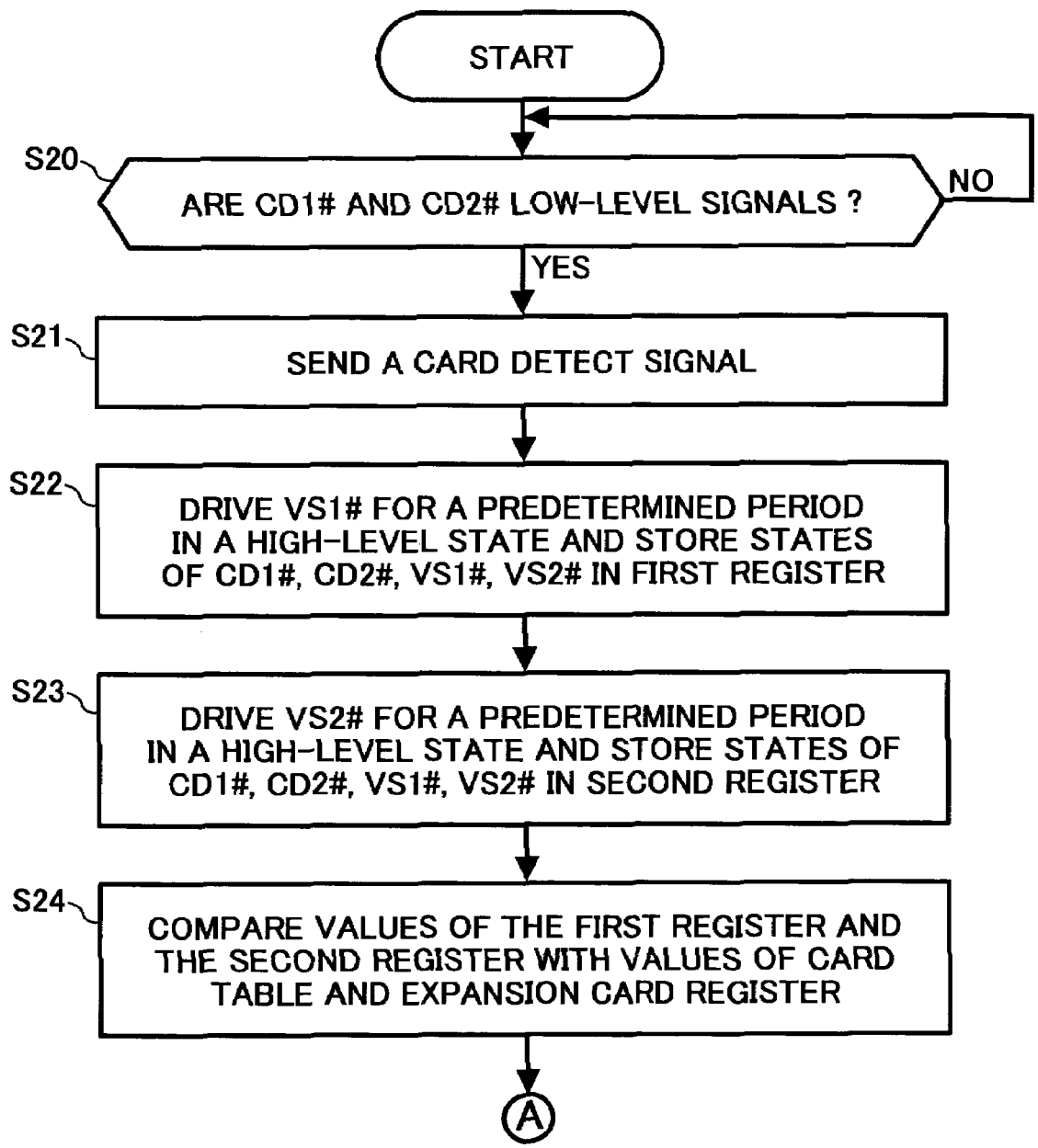

| FIG. 16A |
| FIG. 16B |

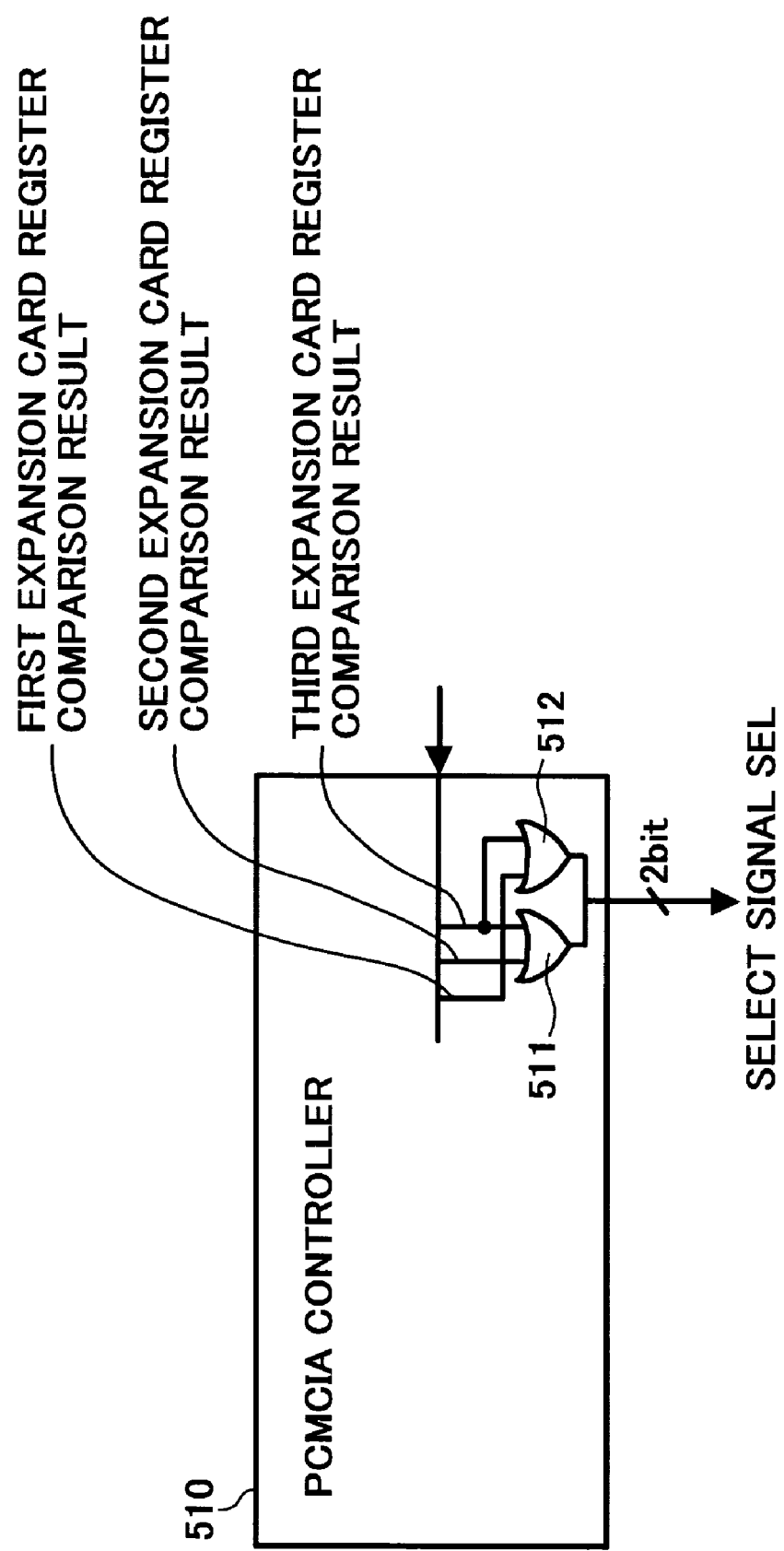

PC CARD CONTROL DEVICE, COMPUTER SYSTEM USING THE PC CARD CONTROL DEVICE, AND PC CARD IDENTIFYING METHOD

The present invention claims priority and contains subject matter related to Japanese patent Application NO. 2002-269935 filed in the Japanese Patent Office on Sep. 17, 2002, and entire contents of which are hereby incorporated by reference.

BACKGROUND

1. Technical Field

The present invention disclosure relates to a device to identify PC cards conforming to a standard , such as the PCMCIA (Personal Computer Memory Card International Association) standard, and a method of identifying such PC cards.

2. Discussion of the Background

Personal computers provided with a device to identify PC cards conforming to the PCMCIA standard (i.e., a so-called PC card slot) are known.

In a PC card conforming to the PCMCIA standard, a female-type connector is provided to a side surface of the card at the side of a short side of the card. The female-type connector is provided with first and second connect holes corresponding to pins of a plurality of pins of a male-type connector provided to a PC card control device, through which first and second card detect signals (defined as CD1# and CD2# by the PCMCIA standard and hereinafter referred to as CD1# and CD2#) flow, and third and fourth connect holes corresponding to pins of the plurality of pins of the male-type connector of the PC card control device, through which first and second voltage select signals (defined as VS1# and VS2# by the PCMCIA standard and hereinafter referred to as VS1# and VS2#) flow.

Inside of the PC card, wirings connected with the first and second connect holes are either grounded or connected with at least either of the third and fourth connect holes. In the PC card control device, both electrical potentials of CD1# and CD2# are in high-level states. When the PC card is connected with the PC card control device, the electrical potentials of CD1# and CD#2 change to low-level states. The PC card control device detects connection of the PC card with the PC card control device based on such a change in the electrical potentials of CD1# and CD2#.

Upon detecting connection of the PC card, the PC card control device detects respective states of CD2#, CD1#, VS2# and VS1# when an electrical potential of VS1# flowing through the third connect hole has been pulled up to a high-level state and when an electrical potential of VS2# flowing through the fourth connect hole has been pulled up to a high-level state, and identifies the type of the PC card (e.g., the signal level used by the PC card and the bit-width of the bus of the PC card) using the states of these signals CD2#, CD1#, VS2# and VS1# for identification information.

Japanese Patent Laid-open publication No. 2001-75746 describes a PC card control device, which recognizes a newly connected PC card. In the PC card control device, when electrical potential states of CD2#, CD1#, VS2#, and VS1# when electrical potentials of VS1# and VS2# flowing through the third and fourth connect holes are selectively pulled up to high-level states agree with an electrical potential state of a reserve PC card specified by the PCMCIA standard and signal states of specified pins other than the above-described pins of a male-type connector of the PC card control device satisfy predetermined conditions, an expansion card (smart card), a bus bit-width and a driving voltage of which have been specified in advance, is recognized.

The PC card control device described in the above JP Patent publication, however, checks signal states of specified pins of a male-type connector of the PC card control device in addition to acquiring regular identification information. Accordingly, a special identification algorithm for identifying expansion cards is necessary, thereby causing an increase in design steps of the PC card control device.

SUMMARY

In an aspect of the present disclosure, a novel PC card control device and a novel PC card identifying method are provided to identify expansion cards relatively easily.

According to a preferred embodiment of the present invention, a PC card control device includes a PC card identifying part configured to identify a type of a card connected with the connector. An identification information acquisition part of the PC card identifying part acquires identification information of the connected card from the connected card with a method conforming to a standard. A first recording part records pieces of first card information and pieces of first identification information of one or more types of PC cards conforming to the standard, and a second recording part records pieces of second card information and pieces of second identification of one or more types of expansion cards not conforming to the standard. The PC card identifying part identifies the type of the connected card based upon the identification information of the connected card acquired by the identification information acquisition part and at least the pieces of second identification information recorded in the second recording part, and to output a result of identifying the type of the connected card and card information of the connected card.

The PC card control device may further include a signal conversion part configured to establish a circuit line to exchange signals with the connected card based upon the result of identifying the type of the connected card, which has been output from the PC card identifying part.

Further, in the PC card control device, the standard may be a PCMCIA standard. In this case, the pieces of second identification information recorded in the second recording part are pieces of information that are acquired by the identification information acquisition part when PC cards conforming to the PCMCIA standard are connected with the PC card control device, respectively, from the connected PC cards with the method conforming to the PCMCIA standard, first and second card detect signal lines and first and second voltage select lines of each of the PC cards being connected with each other as in any of following cases: a case (1) wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, a case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

Furthermore, in the above-described PC card control device, the pieces of second card information and the pieces of second identification information of the one or more types of expansion cards recorded in the second recording part can be updated from the outside.

According to another preferred embodiment of the present invention, a computer system is provided. The computer system includes the above-described PC card control device and a recognition device configured to recognize the type of the connected card based upon the card information of the connected card, which has been output by the PC card identifying part of the PC card control device.

According to still another preferred embodiment of the present invention, a computer system includes the above-described PC card control device and a data updating device configured to update the pieces of second card information and the pieces of second identification information of the one or more types of expansion cards recorded in the second recording part of the PC card control device.

According to another preferred embodiment of the present invention, a PC card identifying method of identifying a type of a card connected with a PC card control device is provided. The method includes steps of: storing pieces of card information and pieces of identification information of one or more types of PC cards conforming to a standard and one or more types of expansion cards not conforming to the standard in advance in the PC card control device; acquiring identification information of the connected card from the connected card with a method conforming to the standard; and identifying the type of the connected card based upon the identification information of the connected card acquired from the connected card and at least the pieces of identification information of the one or more types of expansion cards not conforming to the standard, and outputting a result of identifying the type of the connected card.

The above-described PC card identifying method may further include a step of establishing a circuit line to exchange signals with the connected card based upon the result of identifying the type of the connected card.

Further, in the above-described PC card identifying method, in the storing step, the pieces of card information and the pieces of identification information of the one or more types of expansion cards may be inputted from the outside to be stored in the PC card control device.

Furthermore, the above-described PC card identifying method may further include a step of updating the pieces of card information and the pieces of identification information of the one or more types of expansion cards from the outside.

Further, in the above-described PC card identifying method, the standard may be a PCMCIA standard. In this case, the pieces of identification information of the one or more types of expansion cards stored in the PC card control device in the storing step are pieces of information that are acquired when PC cards conforming to the PCMCIA standard are connected with the PC control device, respectively, from the connected PC cards with the method conforming to the PCMCIA standard, first and second card detect signal lines and first and second voltage select lines of each of the PC cards being connected with each other as in any of following cases: a case (1) wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, a case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 1 is a diagram illustrating a construction of a computer system incorporating a PC card control device according to a preferred embodiment of the present invention;

FIG. 5A through FIG. 5D are diagrams illustrating a card table of PC cards conforming to the PCMCIA standard;

FIG. 6A and FIG. 6B are diagrams illustrating a card table of expansion cards not defined by the PCMCIA standard;

FIG. 14A and FIG. 14B are flowcharts illustrating processes executed by a controller of the PC card identifying part of the another exemplary configuration;

FIG. 17 is a diagram illustrating a configuration of a part of a PCMCIA controller of the PC control device of FIG. 15.

DETAILED DESCRIPTION OF THE PREFERRED EMBODIMENTS

Figure 2B:
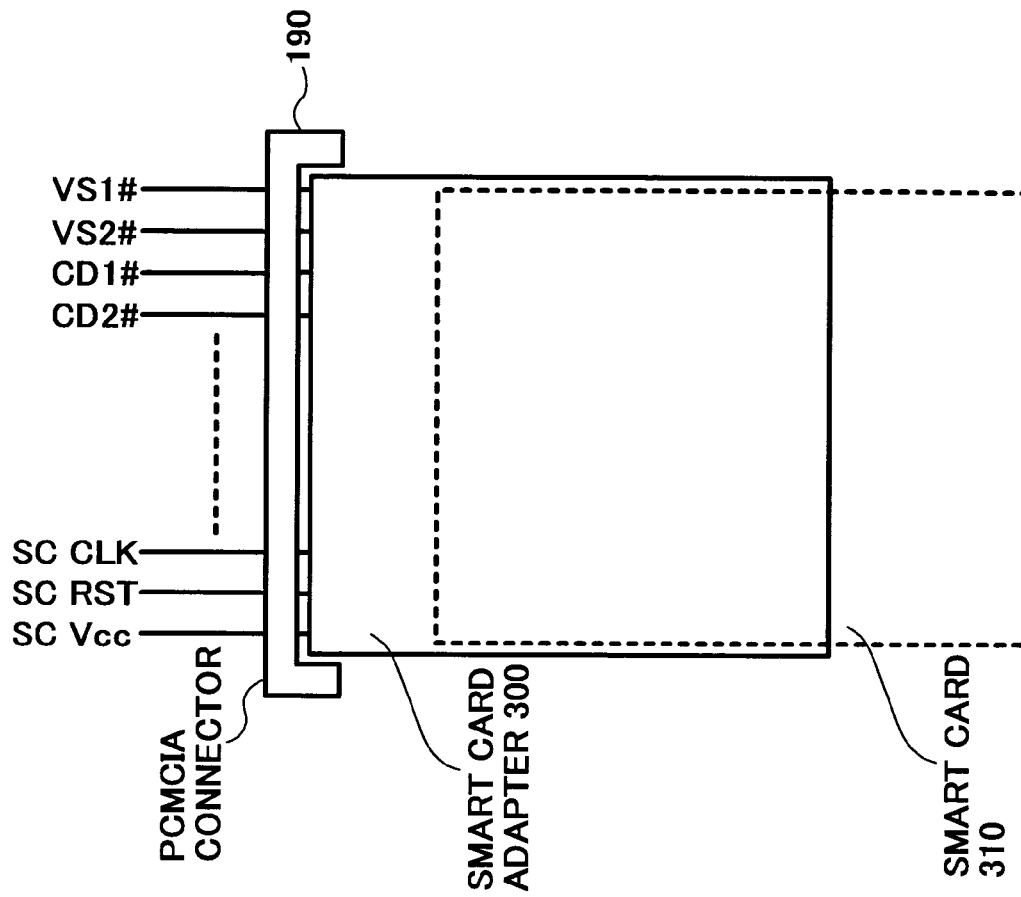
FIG. 2B is a diagram illustrating a state that a smart card as an expansion card is connected with the connector of the PC card control device via an adapter.

Referring now to the drawings, wherein like reference numerals designates identical or corresponding parts throughout the several views, preferred embodiments of the present invention are described.

FIG. 1 illustrates an exemplary construction of a computer system 1 incorporating a PC card control device 100 according to a preferred embodiment of the present invention.

The PC card control device 100 according to the preferred embodiment of the present invention is configured to identify expansion cards by a method of identifying PC cards conforming to the PCMCIA standard. That is, the PC card control device 100 is configured to identify expansion cards without using any special process other than processes of the method of identifying PC cards conforming to the PCMCIA standard. The PC card control device 100 uses pieces of identification information that are not used in PC cards conforming to the PCMCIA standard as pieces of identification information for identifying expansion cards. Thereby, identifying expansion cards is enabled without adding a special identifying algorithm for expansion cards.

Further, the PC card control device 100 is configured such that pieces of identification information for identifying expansion cards and pieces of card information for identifying types of the expansion cards (driving voltages and bus bit widths) can be updated from the outside. Thereby, for example, even when the signal level used by an expansion card has been changed from 5V to 3.3V and the bit width of a bus of the expansion card has been changed from 16 bits to 32 bits, the expansion card can be correctly identified. With this configuration, the PC card control device 100 can identify various types of expansion cards relatively easily.

As illustrated in FIG. 1, the computer system 1 includes a CPU 10; a ROM 11 storing an OS program; a RAM 12; an operation part 13 including a keyboard and a mouse; a display 14, the PC card control device 100; and a hard disk (HD) 15. The hard disk 15 stores a first control program (described later) and a second control program (described later), which are executed by the PC card control device 100, and various application programs and data. These components are connected with each other via a PCI bus 50.

A flash ROM 200 is connected with the PC card control device 100. The flash ROM 200 stores identification information and card information of an expansion card, which is registered by execution of the above first control program of the PC card control device 100. The card information specifies the type of the expansion card, such as the driving voltage and the bit width of the bus. In FIG. 1, the flash ROM 200 is arranged outside of the PC card control device 100. However, the flash ROM 200 may be provided inside of the PC card control device 100.

When the computer system 1 has been activated, the CPU 10 reads out the OS program stored in the ROM 11 into the RAM 12 to be executed, and at the same time initializes the PC card control device 100. Further, a flash ROM I/F 150 writes the identification information and the card information stored in the flash ROM 200 into an expansion card register 182.

Figure 2A:
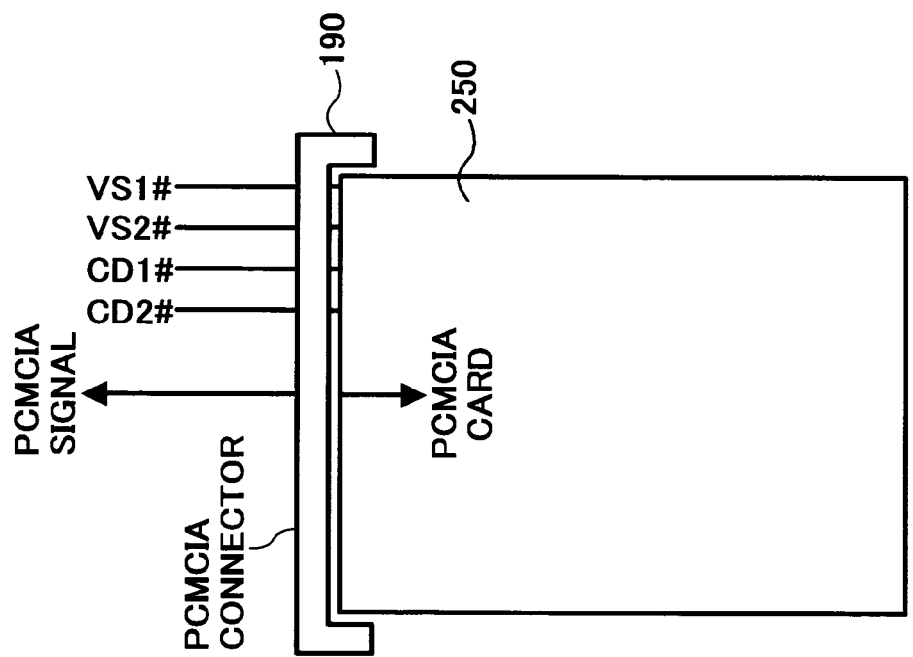
FIG. 2A is a diagram illustrating a state that a PC card conforming to the PCMCIA standard is connected with a connector of the PC card control device.

The PC card control device 100 is configured to identify not only a PC card 250 conforming to the PCMCIA standard, which is connected with a connector 190 as illustrated in FIG. 2A, but also a smart card 310, which is connected with the connector 190 via an adapter 300 as illustrated in FIG. 2B.

The PC card control device 100 includes a PC card identifying part 160 configured to identify the type of a card connected with the connector 190, and a signal conversion part 105 configured to establish a circuit to exchange signals with the card connected with the connector 190 according to an identifying result of the PC card identifying part 160.

A PCI interface 110 connects the PCI bus 50 and an internal bus (not shown) of the PC card control device 100. A PCMCIA controller 120 exchanges data, via a selector 140, with the PC card 250 connected with the connector 190 as illustrated in FIG. 2A. A smart card controller 130 exchanges data between the PCMCIA controller 120 and the smart card 310 when the smart card 310 is connected, as an expansion card, with the connector 190 via the adapter 300 as illustrated in FIG. 2B. The selector 140 connects the PCMCIA controller 120 with the connector 190 directly or via the smart card controller 130, based upon a value of a select signal SEL of 1 bit, which is outputted by the PCMCIA controller 120.

When the computer system 1 including the PC card control device 100 is activated, the flash ROM I/F 150 reads out from the flash ROM 200 identification information (4-bit data of the first register and 4-bit data of the second register) and card information (6-bit data) of the smart card 310 as an expansion card, which have been stored in the flash ROM 200 in advance as described above, and writes the identification information and the card information into the expansion card register 182 of the PC card identifying part 160.

The PC card identifying part 160 identifies a card connected with the connector 190 from among 12 types of PC cards defined by the PCMCIA standard and an expansion card newly registered. The PC card identifying part 160 outputs an identifying result to the PCMCIA controller 120, and at the same time outputs card information of 6 bits representing the type of the connected card (the driving voltage and the bit width of the bus), which is specified according to the identifying result, to the PCMCIA controller 120. The construction and operation of the PC card identifying part 160 will be described later.

Figure 3A:
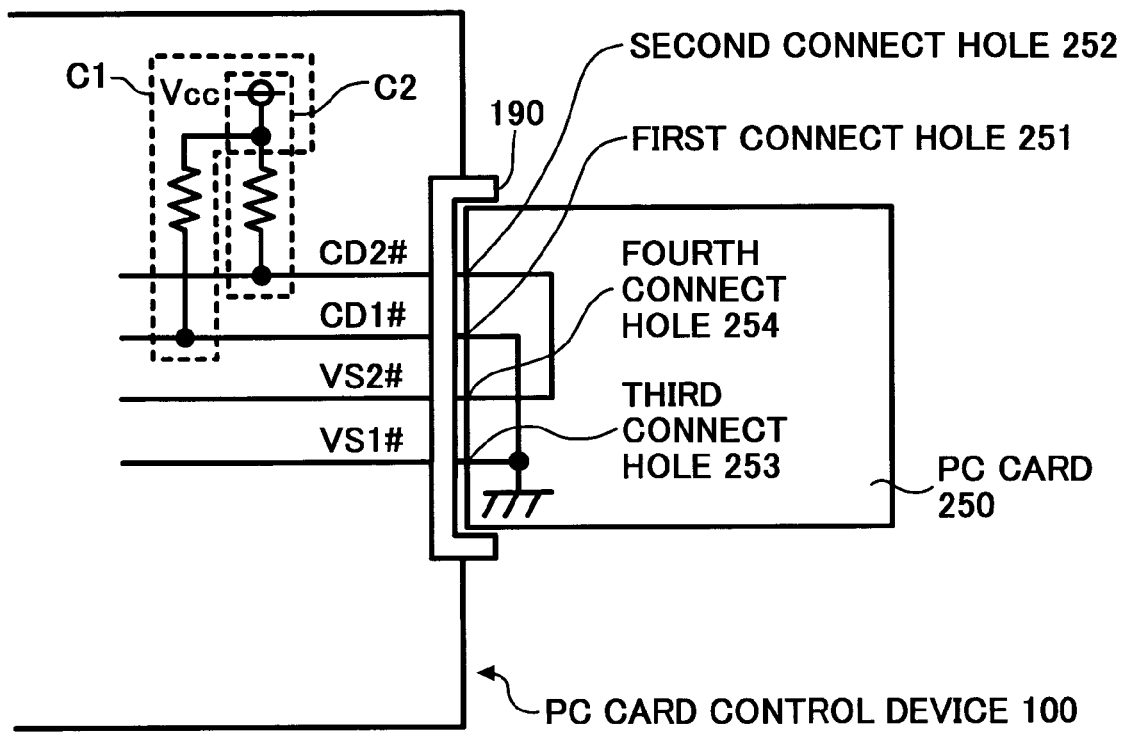
FIG. 3A is a diagram illustrating an example of wirings of the PC card and the PC card control device to identify the PC card connected with the connector of the PC card control device.
Figure 4A:
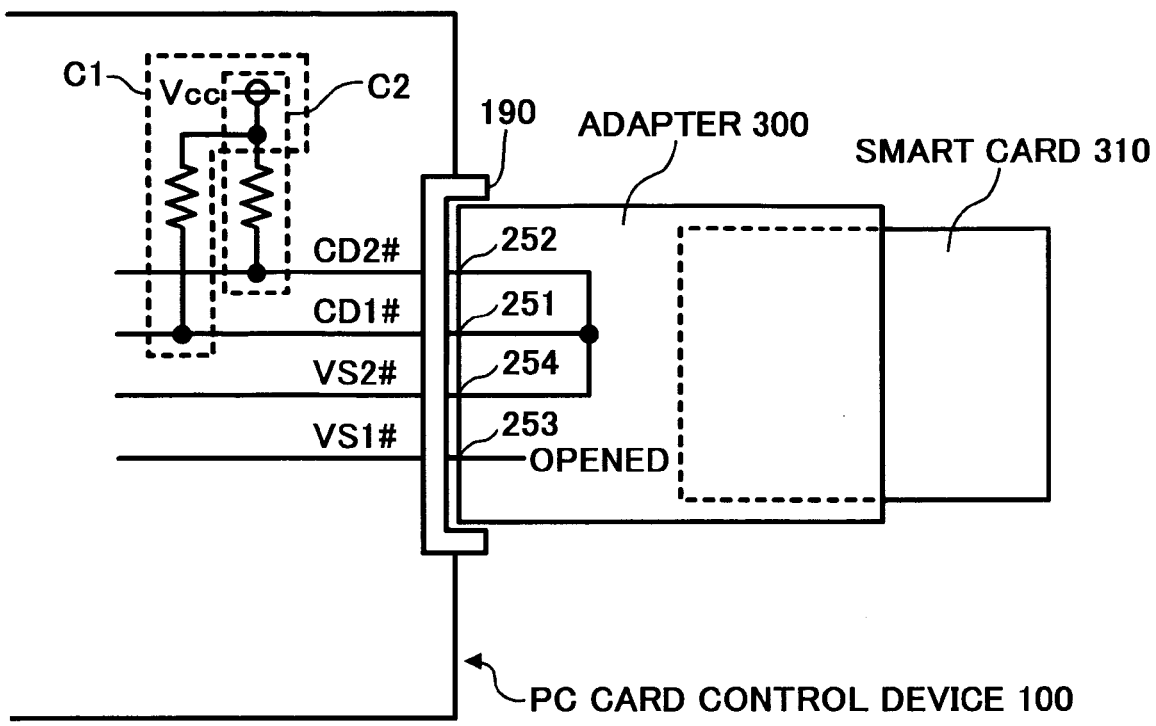
FIG. 4A is a diagram illustrating an example of wirings of the adapter and the PC card control device to identify the smart card as an expansion card connected with the connector of the PC card control device via the adapter.

FIG. 3A illustrates an example of wirings of the PC card 250 and the PC card control device 100 to identify the PC card 250 connected with the connector 190 of the PC card control device 100. FIG. 4A illustrates an example of wirings of the adapter 300 and the PC card control device 100 to identify the smart card 310 as an expansion card connected with the connector 190 via the adapter 300. A female-type connector provided to a side surface at the side of a short side of each of the PC card 250 and the adapter 300 is provided with a first connect hole 251 and a second connect hole 252, which receive pins of the male-type connector 190 of the PC card control device 100, through which the first and second card detect signals (defined as CD1# and CD2# by the PCMCIA standard) flow, and a third connect hole 253 and a fourth connect hole 254, which receive pins of the male-type connector 190 of the PC card control device 100, through which the first and second voltage select signals (defined as VS1# and VS2# by the PCMCIA standard) flow.

Figure 3B:
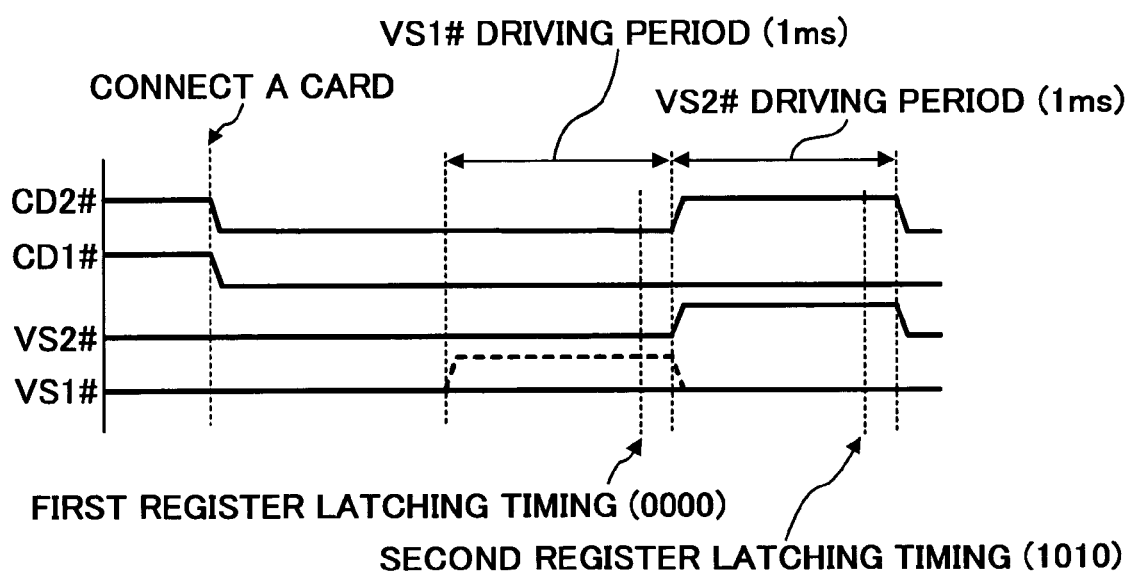
FIG. 3B is a timing chart indicating states of respective signals when detecting the PC card connected with the PC card control device.

The PC card 250 and the adapter 300 are provided with more connect holes for receiving other pins provided to the connector 190 as illustrated in FIG. 2A and FIG. 2B, however, only the first connect hole 251 through the fourth connect hole 254 and wirings connected with these holes are illustrated in FIG. 3A and FIG. 3B to make internal wirings of the PC card control device 100, the PC card 250, and the adapter 300 clearly understandable.

Inside of the PC card 250 and the adapter 300, wirings connected with the first connect hole 251 and the second connect hole 252 respectively are either grounded or connected at least with either of the third connect hole 253 and the fourth connect hole 254. Further, electrical potentials of pins of the male-type connector 190 provided to the PC card control device 100, which are inserted into the first connect hole 251 and the second connect hole 252 respectively, are pulled up to high-level states by pull-up circuits C1 and C2 provided to the PC card control device 100. If the PC card 250 or the adapter 300 is connected with the PC card control device 100, electrical potentials of CD1# and CD2# change to low-level states. The PC card identifying part 160 detects that the PC card 250 or the adapter 300 has been connected with the PC card control device 100 based upon such changes in the electrical potentials of CD1# and CD2#, and performs a card identifying process. The PC card identifying part 160 outputs a card detect signal indicating that a card has been connected with the PC card control device 100 to the CPU 10 via the PCMCIA controller 120, the PCI interface 110 and the PCI bus 50.

In response to detecting that the PC card 250 or the adapter 300 has been connected with the connector 190 based upon changes of electrical potentials of CD1# and CD2# to low-level states, the PC card identifying part 160 detects respective states of CD2#, CD1#, VS2#, and VS1# when an electrical potential of VS1# has been pulled up to a high-level state and when an electrical potential of VS2# has been pulled up to a high-level state. The PC card identifying part 160 compares 8-bit (4 bits+4 bits) data (identification information) representing the states of these signals with 8-bit data (identification information) of 12 types of PC cards (No. 1 through NO. 12) conforming to the PCMCIA standard, which are defined by a card table 183 illustrated in FIG. 5, and 8-bit data (identification information) of an expansion card stored in the expansion card register 182, and identifies the PC card 250 or the adapter 300 connected with the connector 190 as one of the 12 types of PC cards and the expansion card.

Figure 4B:
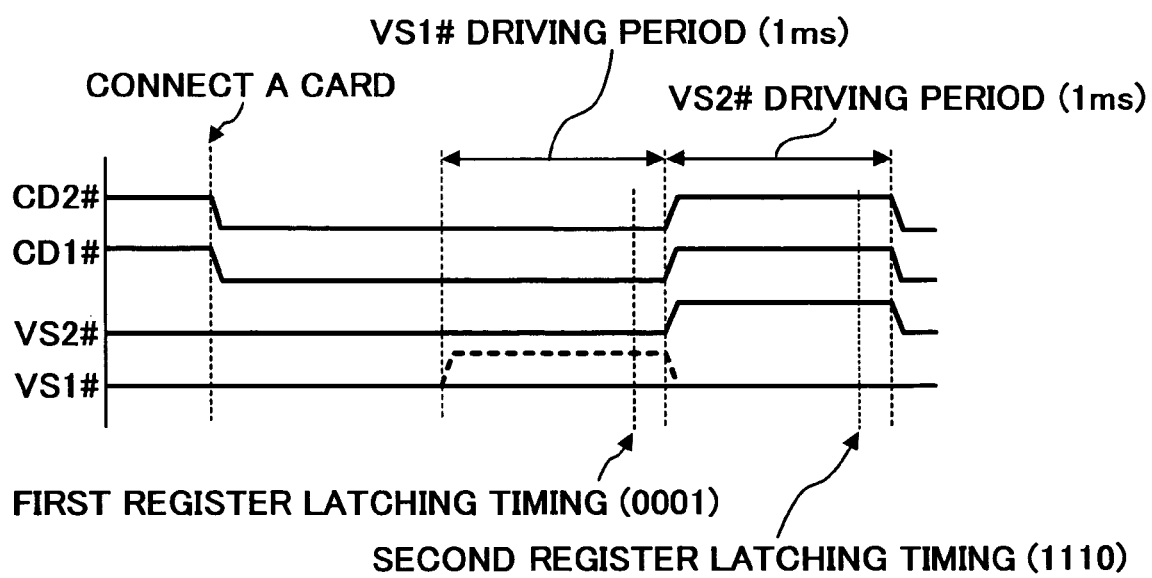
FIG. 4B is a timing chart indicating states of respective signals when detecting the smart card as an expansion card connected with the PC card control device via the adapter.

FIG. 3B is a timing chart indicating states of CD2#, CD1#, VS2#, and VS1# when the PC card 250 is connected with the PC card control device 100. FIG. 4B is a timing chart indicating states of CD2#, CD1#, VS2#, and VS1# when the smart card 310 is connected with the PC card control device 100 via the adapter 300.

As illustrated in FIG. 3B and FIG. 4B, if the PC card 250 or the adapter 300 is connected with the PC card control device 100, electrical potentials of CD1# and CD#2 change to low-level states. The PC card identifying part 160 of the PC card control device 100 detects that the PC card 250 or the adapter 300 has been connected with the PC card control device 100 by these changes in the electrical potential states of CD1# and CD#2, and pulls up an electrical potential of VS1# to a high-level state for about 1 ms. The first register 180 (see FIG. 1) of the PC card identifying part 160 latches states of CD2#, CD1#, VS2#, and VS1# in timing about 0.8 ms after the electrical potential of VS1# has been pulled up to the high-level state.

Then, the PC card identifying part 160 pulls up an electrical potential of VS2# to a high-level state for about 1 ms. The second register 181 (see FIG. 1) of the PC card identifying part 160 latches states of CD2#, CD1#, VS2#, and VS1# in timing about 0.8 ms after the electrical potential of VS2# has been pulled up to the high-level state.

In the case of the PC card 250 illustrated in FIG. 3A, "0000" is latched in the first register 180, and "1010" is latched in the second register 181. As described below, by referring to the card table 183 illustrated in FIG. 5A through FIG. 5D (illustrated in FIG. 1 also), the PC card identifying part 160 recognizes that the PC card 250 corresponds to a card of NO. 7, which is a CardBus (32-bit) card and is driven by 3.3V or X.XV. Card information as to the type of a card, such as that the bit width of the bus is a CardBus and that the driving voltage is 3.3V or X.XV, is defined by 6-bit data prepared in advance in the card table 183. The 6-bit data represents, in order from a most significant bit, whether or not the card is a 16-bit card, whether or not the card is a 32-bit card, whether or not the driving voltage is 5V, whether or not the driving voltage is 3.3V, whether or not the driving voltage is X.XV, and whether or not the driving voltage is Y.YV. In this example, the PC card identifying part 160 outputs 6-bit data representing the type of the card of NO. 7 to the CPU 10 via the PCI bus 50 as card information.

In the case of the smart card adapter 300 illustrated in FIG. 4A, "0001" is latched in the first register 180 and "1110" is latched in the second register 181. The adapter 300 is not registered in the card table 183 of FIG. 5A through FIG. 5D. As described below, by preparing in advance 8-bit data "00011110", in which "0001" and "1110" have been put together, as identification information of the adapter, and 6-bit data (card information) representing the type of the smart card 310, in the expansion card register 182, the PC card identifying part 160 identifies the adapter 300, and at the same time outputs the 6-bit data specifying the type of the smart card 310 to the CPU 10 via the PCI bus 50 as card information.

FIG. 6A and FIG. 6B illustrates a table of 6 expansion cards, which are not defined by the PCMCIA standard. The table indicates 6 connection patterns of the first connect hole 251 through the fourth connect hole 254, that are conceivable other than those connection patterns of 12 PC cards indicated in the card table 183 illustrated in FIG. 5A through FIG. 5D. The table also indicates 4-bit data which is latched in the first register 180 and 4-bit data which is latched in the second register 181 (8 bits in total) when VS1# and VS#2 are changed to high-level states respectively, with respect to each of 6 expansion cards. Data of the first register and the second register of one of the 6 expansion cards illustrated in FIG. 6A and FIG. 6B is stored in the expansion card register 182 of the PC card identifying part 160 as 4-bit data to be latched in the first register 180 and 4-bit data to be latched in the second register 181. The expansion card register 182 also stores 6-bit data specifying the type (the bit width of the bus and the driving voltage) of the one of the 6 expansion cards.

Figures 7, 7A:
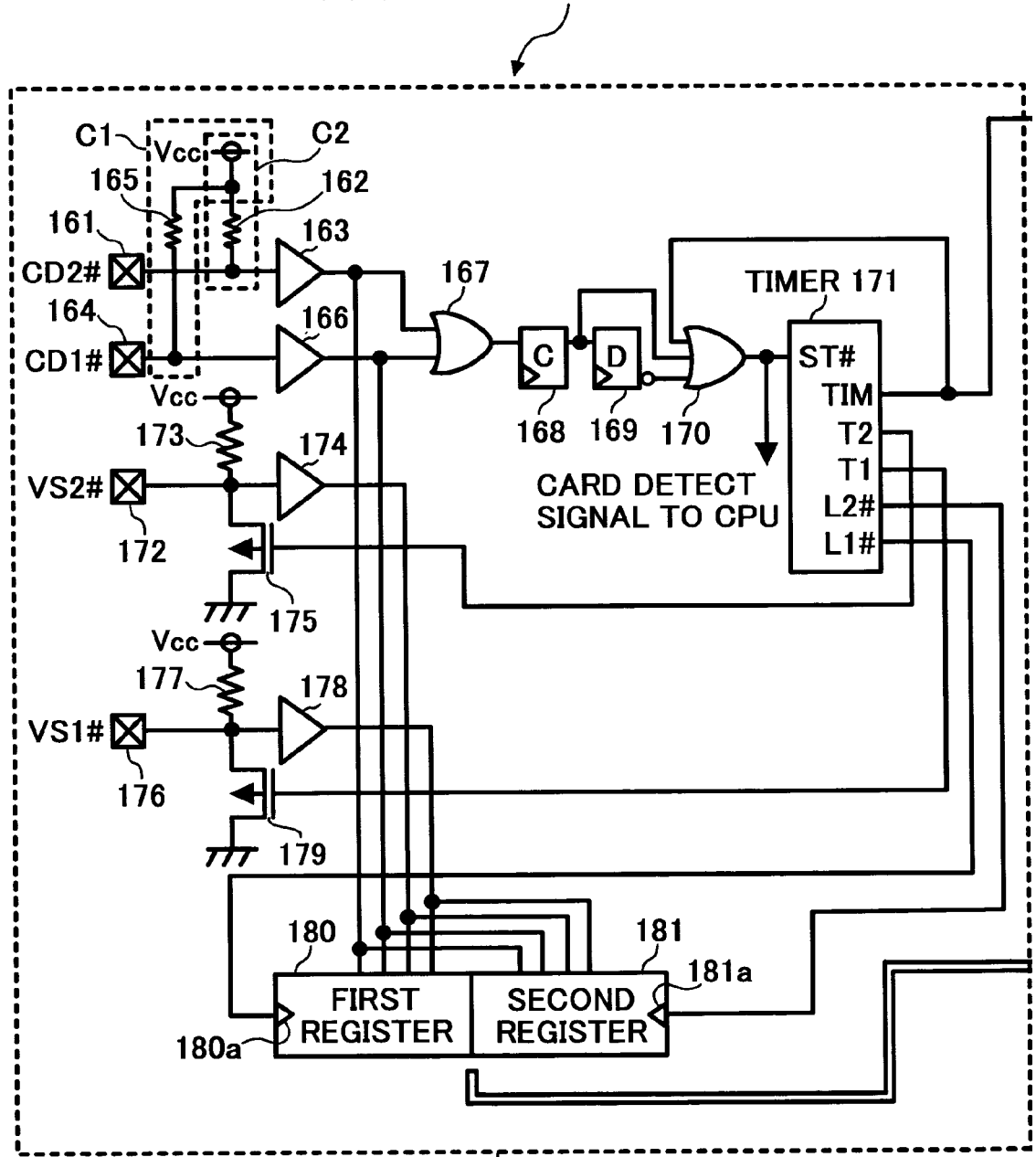
FIG. 7A and FIG. 7B are diagrams illustrating an exemplary configuration of a PC card identifying part of the PC card control device.
Figure 7B:
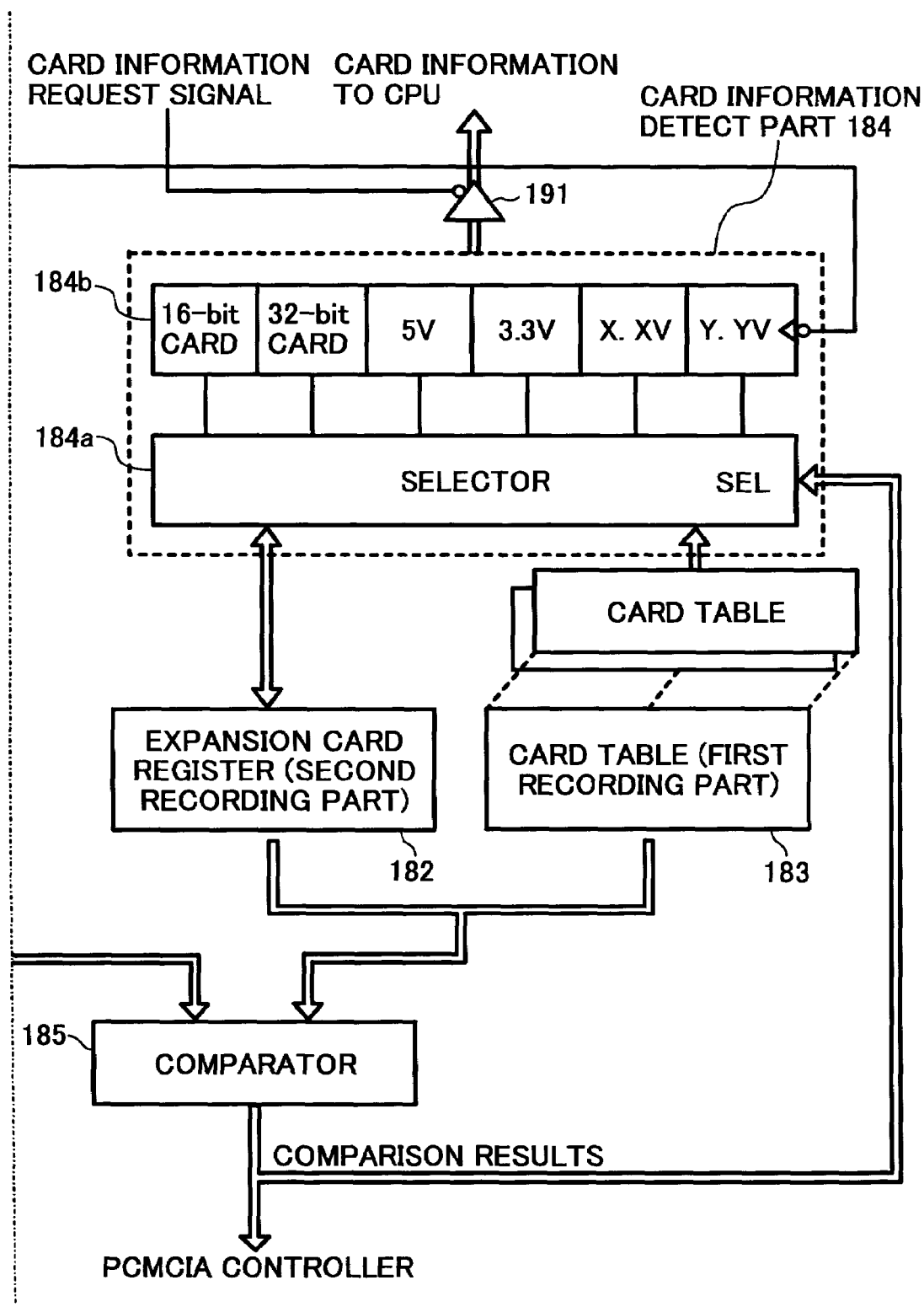

FIG. 7A and FIG. 7B illustrate the construction of the PC card identifying part 160. The PC card identifying part 160 includes an identification information acquisition part D configured to acquire identification information (8-bit data) of a card connected with the connector 190 into the first register 180 and the second register 181, a comparator 185 configured to compare the identification information acquired by the identification information acquisition part D and pieces of identification information recorded in the card table 183 as a first recording part and the expansion card register 182 as a second recording part and to output comparison results, and a card information detect part 184 configured to detect card information (6-bit data) specifying the type of the connected card based upon the comparison results by the comparator 185 and to output the card information to the CPU 10.

In the identification information acquisition part D, an electrical potential of a terminal 161, to which CD2# is input, is pulled up to a high-level state by the pull-up circuit C2, which includes a power source Vcc and a resistor 162, and an electrical potential of a terminal 164, to which CD1# is input, is pulled up to a high-level state by the pull-up circuit C1, which includes the power source Vcc and a resistor 165. CD2# and CD#1, which have been input to the terminal 161 and the terminal 164, are input into a 2-input OR gate 167 via buffer circuits 163 and 166 respectively.

An output of the OR gate 167 is input into a delay-type flip-flop 168. An output of the delay-type flip-flop 168 is input into a subsequent delay-type flip-flop 169. An inversion output terminal of the delay-type flip-flop 169, an output of the delay-type flip-flop 168, and a TIM signal line, which is changed to a high-level state at the same time when a timer 171 is activated as described below, are connected with respective signal input terminals of a 3-input OR gate 170. An output terminal of the OR gate 170 is connected with an input terminal of the timer 171 to input a start signal ST#. When the PC card 250, or the adapter 300 in which the smart card 310 has been loaded, is inserted into the connector 190 and electrical potentials of CD1# and CD2# are changed from high-level states to low-level states as described later, the OR gate 170 temporarily outputs a low-level signal as the start signal ST#. The start signal ST# is output to the CPU 10 also as a card detect signal.

The timer 171 is activated by receiving the above-described low-level start signal ST#, and outputs signals T1, T2, L1#, and L2# of predetermined levels in timings described later.

A terminal 172, into which VS2# is input, is connected with the power source Vcc via a resistor 173, and with a P-channel-type MOSFET 175, which is a semiconductor switch, and a buffer circuit 174. A signal T2, which is output by the timer 171, is input into a gate of the MOSFET 175.

Similarly, a terminal 176, into which VS#1 is input, is connected with the power source Vcc via a resistor 177 and with a P-channel-type MOSFET 179, which is a semiconductor switch, and a buffer circuit 178. A signal T1, which is output by the timer 171, is input into a gate of the MOSFET 179.

Four signals, CD2#, CD1#, VS2#, and VS3#, which are output from the buffer circuits 163, 166, 174, and 178, are input into the first register 180 and the second register 181, respectively. A signal L1#, which is output from the timer 171, is input into a latch terminal 180a of the first register 180. The first register 180 records states of CD2#, CD1#, VS2# and VS1# in response to inputting of a low-level signal L1#. A signal L2#, which is output from the timer 171, is input into a latch terminal 181a of the second register 181. The second register 181 records states of CD2#, CD1#, VS2# and VS1# in response to inputting of a low-level signal L2#.

Figure 8:
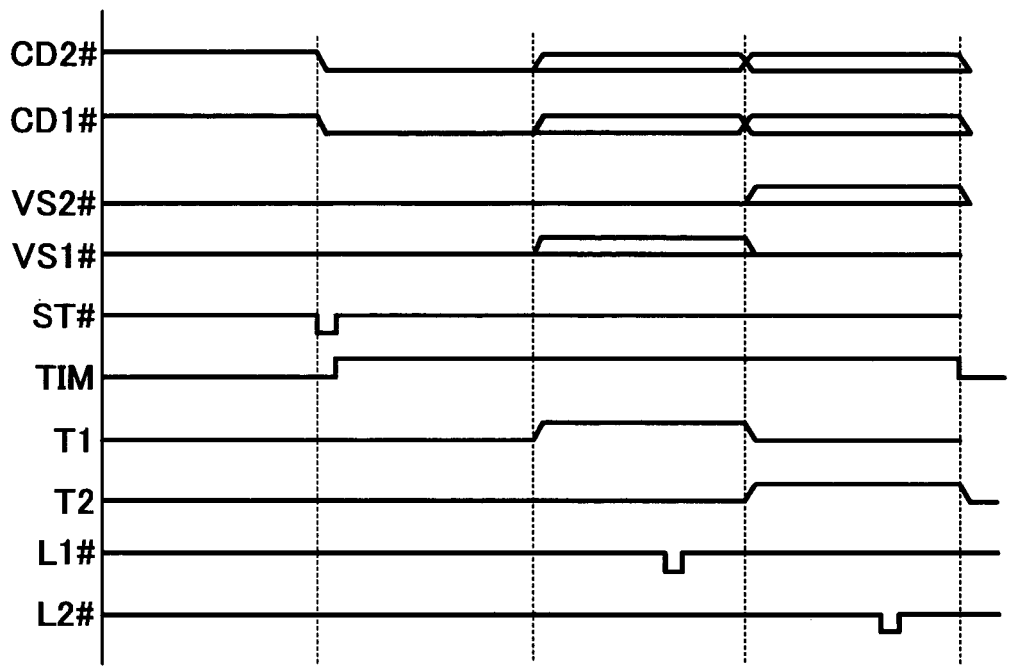
FIG. 8 is a timing chart of CD1#, CD2#, VS1#, VS2#, and signals which are output from a timer of the PC card identifying part.

FIG. 8 is a timing chart of CD2#, CD1#, the signal ST# which is input into the timer 171, and the signals T1, T2, L1#, and L2# which are output by the timer 171. The timer 171 is activated when electrical potentials of CD1# and CD2# have been changed from high-level states to low-level states and the low-level start signal ST# has been input from the OR gate 170.

As the timer 171 is activated, the electrical potential of the signal TIM is changed to a high-level state. Thereby, the electrical potential of the signal ST#, which is output by the OR gate 170, changes to a high-level state. The timer 171 first changes the electrical potential of the signal T1 to a high-level state. Thereby, the semiconductor switch (P-channel-type MOSFET) 179 is turned off, and a high-level signal is output to VS1#. About 0.8 ms thereafter, the timer 171 outputs a low-pulse signal L1#, and states of signals, which are output by the buffer circuits 163, 166, 174 and 178, are stored in the first register 180. Thereafter, the timer 171 changes the electrical potential of the signal T2 to a high-level state instead of the signal T1. Thereby, the semiconductor switch (P-channel-type MOSFET) 175 is turned off, and a high-level signal is output to VS2#. About 0.8 ms thereafter, the timer 171 outputs a low-pulse signal L2#, and states of signals, which are output by the buffer circuits 163, 166, 174 and 178, are stored in the second register 181.

Even when high-level signals are output to VS1# and VS2#, if VS1# and VS2# are grounded inside of the PC card 250 or the adapter 300 loaded with the smart card 310, which has been inserted into the connector 190, apparent electrical potentials of VS1# and VS2# are in low-level states.

The timer 171 thus outputs respective signals of predetermined levels in timings described above, and thereby electrical potential states of CD2#, CD1#, VS2#, VS1# are stored in the first register 180 and the second register 181.

Referring back to FIG. 7A and FIG. 7B, in the expansion card register 182 stored are 8-bit data (identification information) of the adapter 300 as values to be latched in the first register 180 and the second register 181 when the adapter 300 into which the smart card 310 as an expansion card has been loaded is connected with the connector 190, and 6-bit data (card information) specifying the type of the smart card 310 (the bit width of the bus and the driving voltage). The expansion card register 182 outputs the 8-bit data (identification information) of the adapter 300 to the comparator 185 and the 6-bit data (card information) specifying the type of the smart card 310 to the card information detect part 184.

In the card table 183 stored are pieces of 8-bit data (identification information) of 12 types of PC cards defined by the card table 13 illustrated in FIGS. 5A through 5D, indicating values to be latched in the first register 180 and the second register 181 when the 12 types of PC cards are connected with the connector 190, respectively, and pieces of 6-bit data (card information) specifying types of respective PC cards. The card table 183 outputs the pieces of 8-bit data of the 12 types of PC cards to the comparator 185 in parallel and the pieces of 6-bit data of the 12 types of PC cards to the card information detect part 184.

The comparator 185 compares 8-bit data (4 bits+4 bits) stored in the first register 180 and the second register 181 with 8-bit data of an expansion card and pieces of 8-bit data of 12 types of PC cards, which are output from the expansion card register 182 and the card table 183 in parallel (i.e., 13 pieces of 8-bit data of 13 cards in total), and outputs comparison results with respect to the 13 cards (a 1-bit comparison result signal with respect to each of the 13 cards) A high-level comparison result signal is output when 8-bit data stored in the first register 180 and the second register 181 agrees with 8-bit data which is output from the expansion card register 182 or the card table 183, and a low-level comparison result signal is output when the 8-bit data stored in the first register 180 and the second register 181 does not agree with the 8-bit data which is output from the expansion card register 182 or the card table 183. The comparison result signals are output to the PCMCIA controller 120 (see FIG. 1) and to the card information detect part 184.

The card information detect part 184 includes a selector 184a, and a resister 184b for 6 bits. The 6-bit data of the expansion card stored in the expansion card register 182 and the pieces of 6-bit data of the 12 types of PC cards stored in the card table 183, each representing the type (the bit width of the bus and the driving voltage) of each card, are input in parallel into the selector 184a. The selector 184a outputs 6-bit data of a card, for which the above-described high-level comparison signal has been output from the comparator 185, to the register 184b. An inverted signal of the signal TIM is input into a latch terminal of the register 184b from the timer 171. After the timer 171 has output the pulse signal L2#, and CD2#, CD1#, VS2#, and VS1# have been stored into the second register 181, at the same time when the electrical potential of the signal TIM changes to a low-level state, the register 184b latches 6-bit data which is output from the selector 184a.

The 6-bit data latched by the register 184b represents, in order from a most significant bit, whether or not a card connected with the connector 190 is a 16-bit card, whether or not the card is a 32-bit card, whether or not the driving voltage is 5V, whether or not the driving voltage is 3.3V, whether or not the driving voltage is X.XV, and whether or not the driving voltage is Y.YV, and each bit is set to "1" when the card falls under the corresponding category and to "0" when the card does not fall under the corresponding category.

The register 184b outputs the latched 6-bit data to a 3-state buffer 191. The 3-state buffer 191 outputs, in response to a low-level card information request signal from the CPU 10, the 6-bit data to the CPU 10, as data representing the type of a card connected with the connector 190, via the PCMCIA controller 120, the PCI interface 110, and the PCI bus 50. The CPU 10 exchanges data with the card connected with the connector 190 based upon received information as to the type of the connected card.

Figure 9:
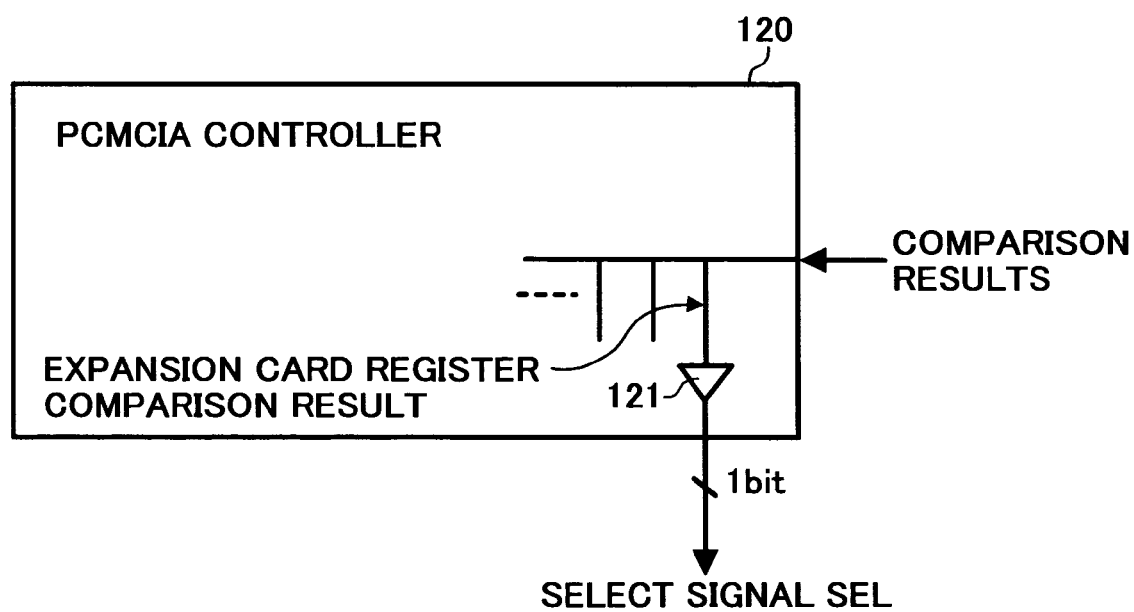
FIG. 9 is a diagram illustrating an exemplary configuration of a part of a PCMCIA controller of the PC card control device.

FIG. 9 illustrates an exemplary configuration of a part of the PCMCIA controller 120. As illustrated in figure, among comparison results which are input from the PC card identifying part 160, the PCMCIA controller 120 outputs a comparison result of 8-bit data stored in the first register 180 and the second register 181 and 8-bit data stored in the expansion card register 182, via a buffer circuit 121 constituted of two CMOS inverters connected with each other in series. When 8-bit data stored in the first register 180 and the second register 181 agrees with 8-bit data stored in the expansion card register 182, a high-level signal is output as a select signal SEL. When 8-bit data stored in the first register 180 and the second register 181 does not agree with 8-bit data stored in the expansion card register 182, a low-level signal is output as the select signal SEL.

Referring back to FIG. 1, the selector 140 receiving the high-level select signal SEL from the PCMCIA controller 120 judges as that a connected card is a smart card, and connects the smart card controller 130 with the connector 190. The PCMCIA controller 120 can recognize the smart card 310 via the smart card controller 130.

When the selector 140 receives the low-level select signal SEL from the PCMCIA controller 120, the selector 140 judges as that the connected card is a PC card, and directly connects the PCMCIA controller 120 with the connector 190.

Figure 10:
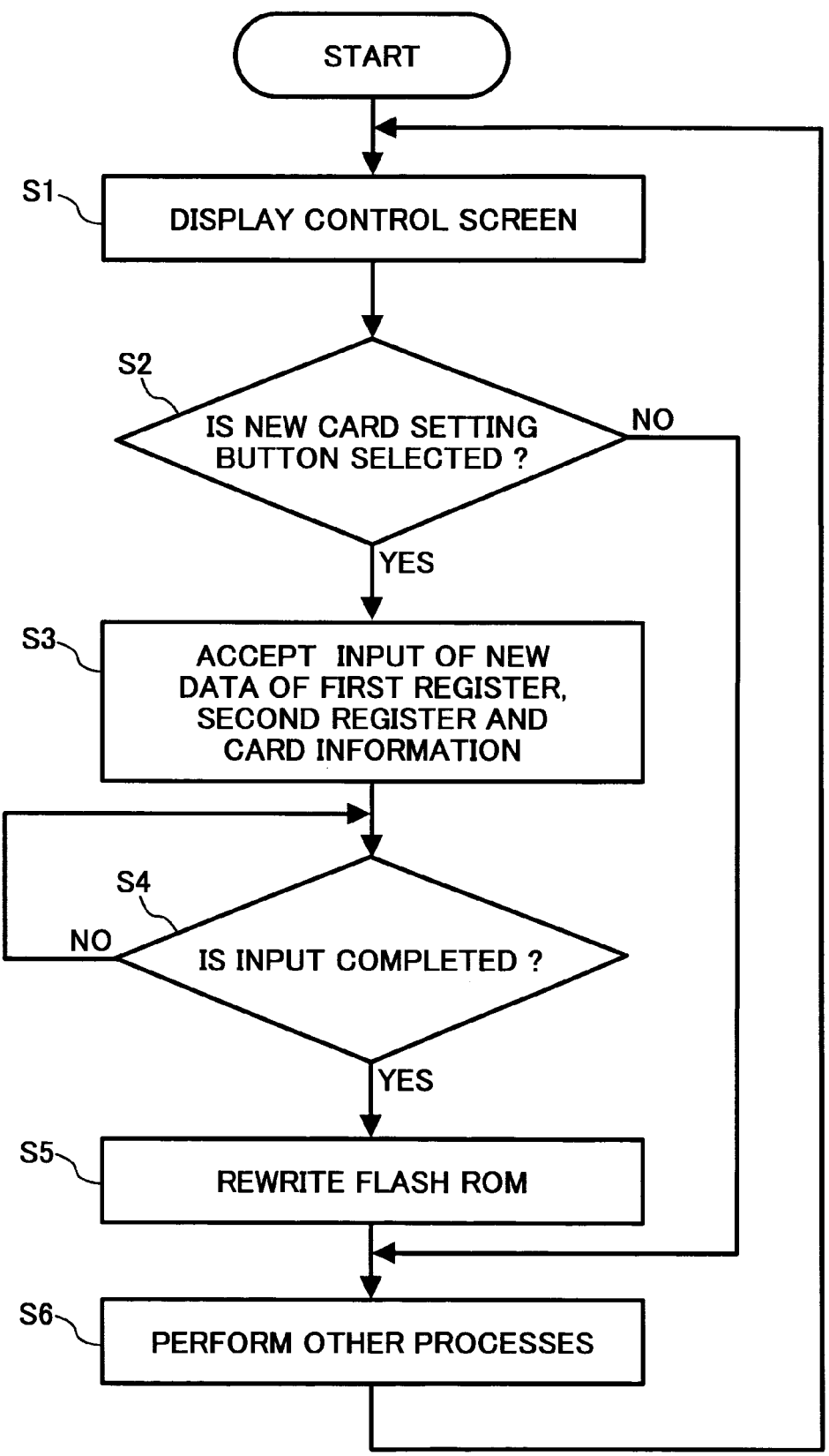
FIG. 10 is a flowchart illustrating processes of a first control program of the PC card control device, which is executed by a CPU of the computer system.
Figure 11A:
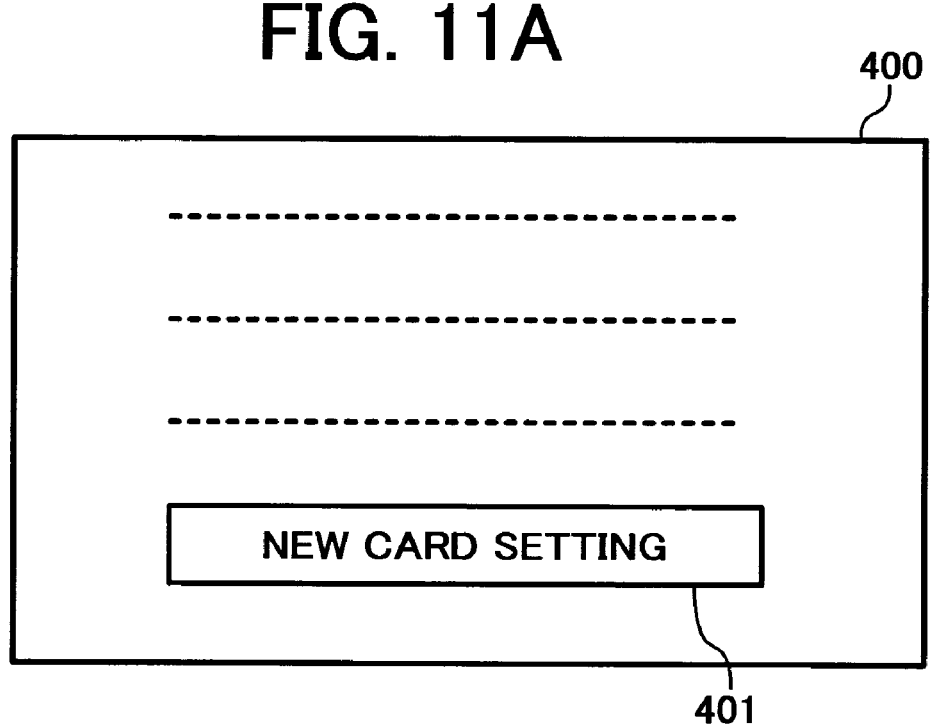
FIG. 11A is a diagram illustrating a control screen displayed on a display of the computer system when the first control program is executed.
Figure 11B:
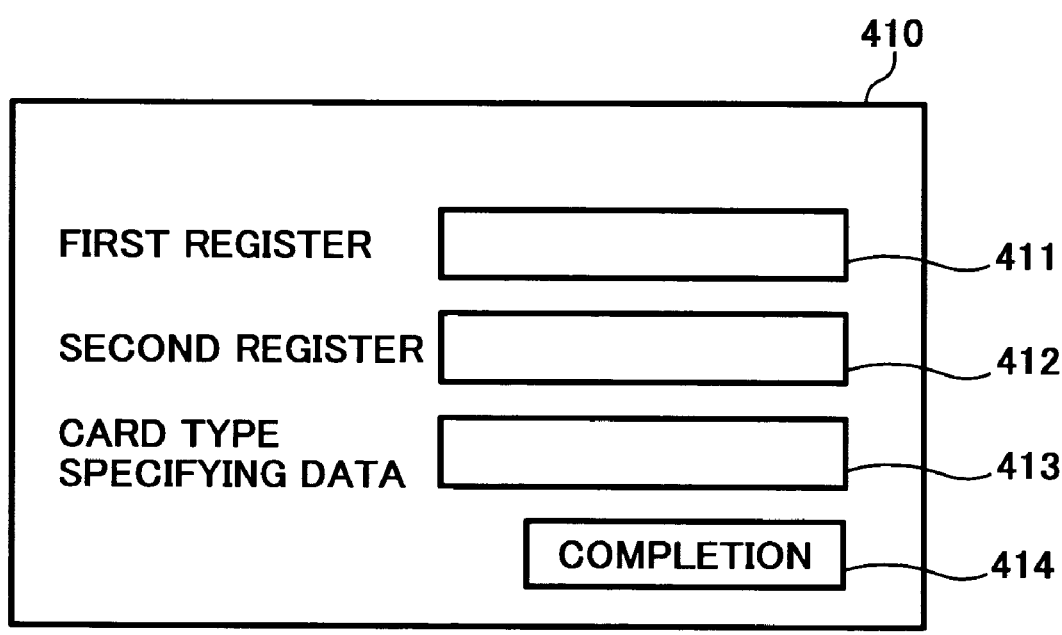
FIG. 11B is a diagram illustrating an input screen displayed on the display when the first control program is executed.

FIG. 10 is a flowchart of a process of the first control program of the PC card control device 100, which is executed by the CPU 10. First, with a predetermined operation of the operation part 13 by a user, a PC card control screen 400 illustrated in FIG. 11A is displayed on the display 14 (step S1). If a new card setting button 401 displayed on the control screen 400 is selected by the user with an operation of the operation part 13 (YES in step S2), an input screen 410 illustrated in FIG. 11B is displayed on the display 14.

Here, the user selects one of 6 expansion cards illustrated in the table of FIG. 6A and FIG. 6B, and inputs combination of pieces of 4-bit data of the first register and the second register of the selected one of the 6 expansion cards into an input box 411 and an input box 412, and 6-bit data (card information) specifying the type of the selected one of the 6 expansion cards into an input box 413 (step S3). The user thereafter selects a completion button 414 (step S4). The 6-bit data represents, in order from a most significant bit, whether or not the selected one of the 6 expansion cards is a 16-bit card, whether or not the card is a 32-bit card, whether or not the driving voltage is 5V, whether or not the driving voltage is 3.3V, whether or not the driving voltage is X.XV, and whether or not the driving voltage is Y.YV, and each bit is set to "1" when the card falls under the corresponding category and to "0" when the card does not fall the corresponding category.

When the completion button 414 is selected by the user with an operation of the operation part 13 (YES in step S4), the CPU 10 writes into the flash ROM 200, via the PCI interface 110 and the flash ROM interface 150, 14-bit data consisted of the 4-bit data which has been input into the input box 411, the 4-bit data which has been input into the input box 412, and the 6-bit data which has been input into the input box 413 (step S5). When 14-bit data has been already written in the flash ROM 200, the previously written 14-bit data is updated with the above 14-bit data inputted this time. If the new card setting button 401 is not selected (NO in step S2), the processes of steps S3 through S5 are skipped. After other processes are performed (step S6) the process returns to step S1.

Figure 12:
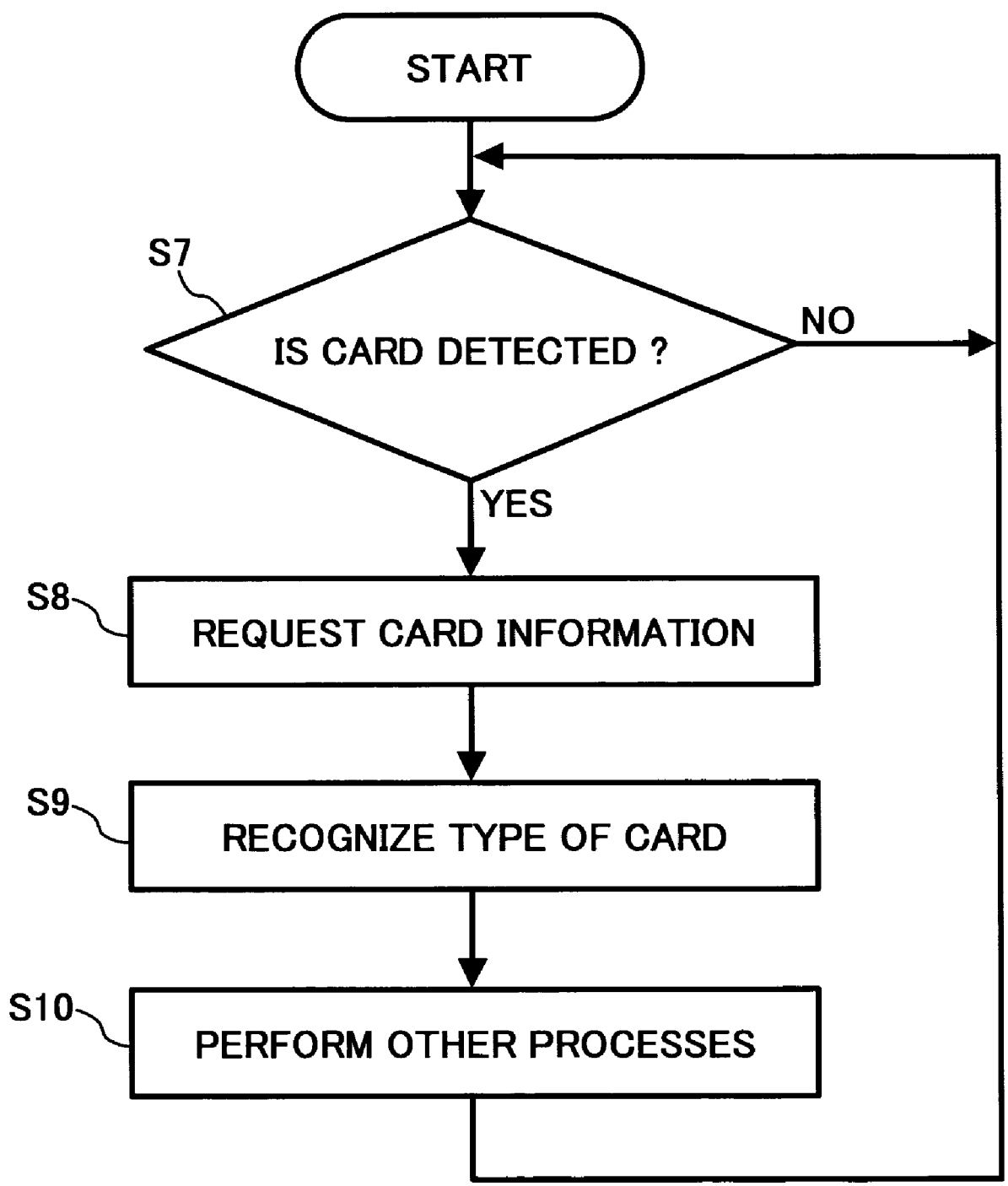
FIG. 12 is a flowchart illustrating processes of a second control program of the PC card control device, which is executed by the CPU of the computer system.

FIG. 12 is a flowchart of a process of the second control program, which is always executed by the CPU 10 after the power supply source has been turned on. When a card detect signal is sent to the CPU 10 from the card identifying part 160 of the PC card control device 100 (YES in step S7), the CPU 10 outputs a card information request signal to the card information detect part 184 of the card identifying part 160 (step S8). The CPU 10 recognizes the type of a card based upon card information, which is output from the card information detect part 184 in response to the above-described card information request signal (step S9), and performs necessary processes (step S10). When a card detect signal is not sent to the CPU 10 (NO in step S7), the process waits in step S7 until a card detect signal is sent.

Thus, by providing the PC card control device 100 configured as described above to be connected with the PCI bus 50 and by executing the above-described PC card control programs, it is possible to cause new types of expansion cards other than those 12 types of PC cards defined by the card table 183 illustrated in FIG. 5 to be recognized by the CPU 10.

Figure 13:
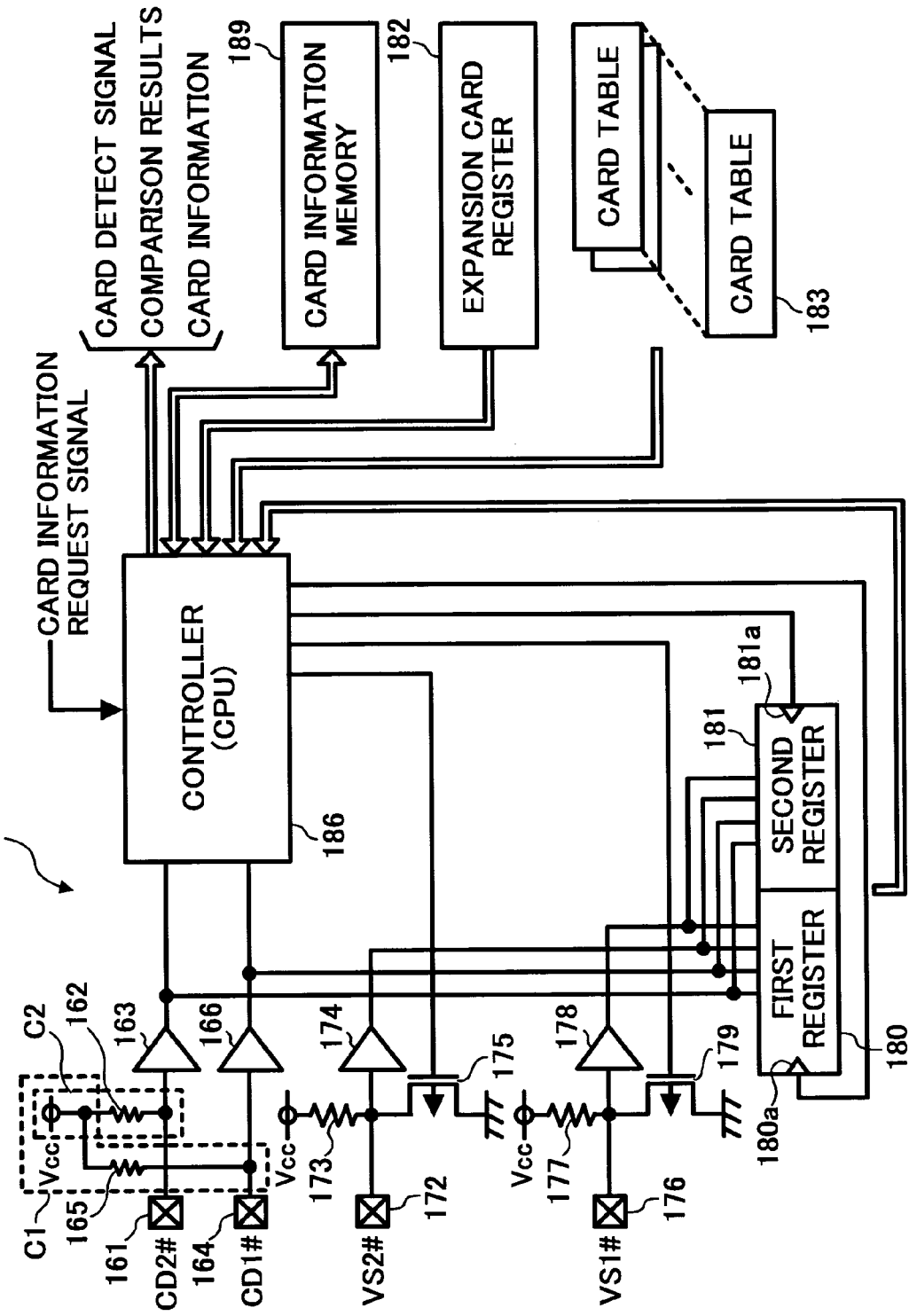
FIG. 13 is a diagram illustrating another exemplary configuration of the PC card identifying part of the PC card control device.

FIG. 13 illustrates a PC card identifying part 160a provided to the PC card control device 100 of the present invention, which is configured differently from the above-described PC card identifying part 160.

In FIG. 13, parts of the PC card identifying part 160a, which are identical or corresponding to those of the PC card identifying part 160, are designated by like reference numerals, and description thereof is omitted. While the PC card identifying part 160 realizes detection of a PC card and an expansion card with hardware circuits, the PC card identifying part 160a performs detection of a PC card and an expansion card with software processes. More specifically, in the PC card identifying part 160a, such processes in the PC card identifying part 160 as detecting a connection of a card with the connector 190 based on decreasing of electrical potentials of CD1# and CD2#, outputting a card detect signal to the CPU 10, and processes executed by the timer 171, the comparator 185, and the card information detect part 184, are performed by a controller 186 with calculation processes. Accordingly, the PC card identifying part 160a does not include the PC card detect part 184 and the comparator 185 provided in the PC card identifying part 160, and instead includes a card information memory 189.

Figure 14B:
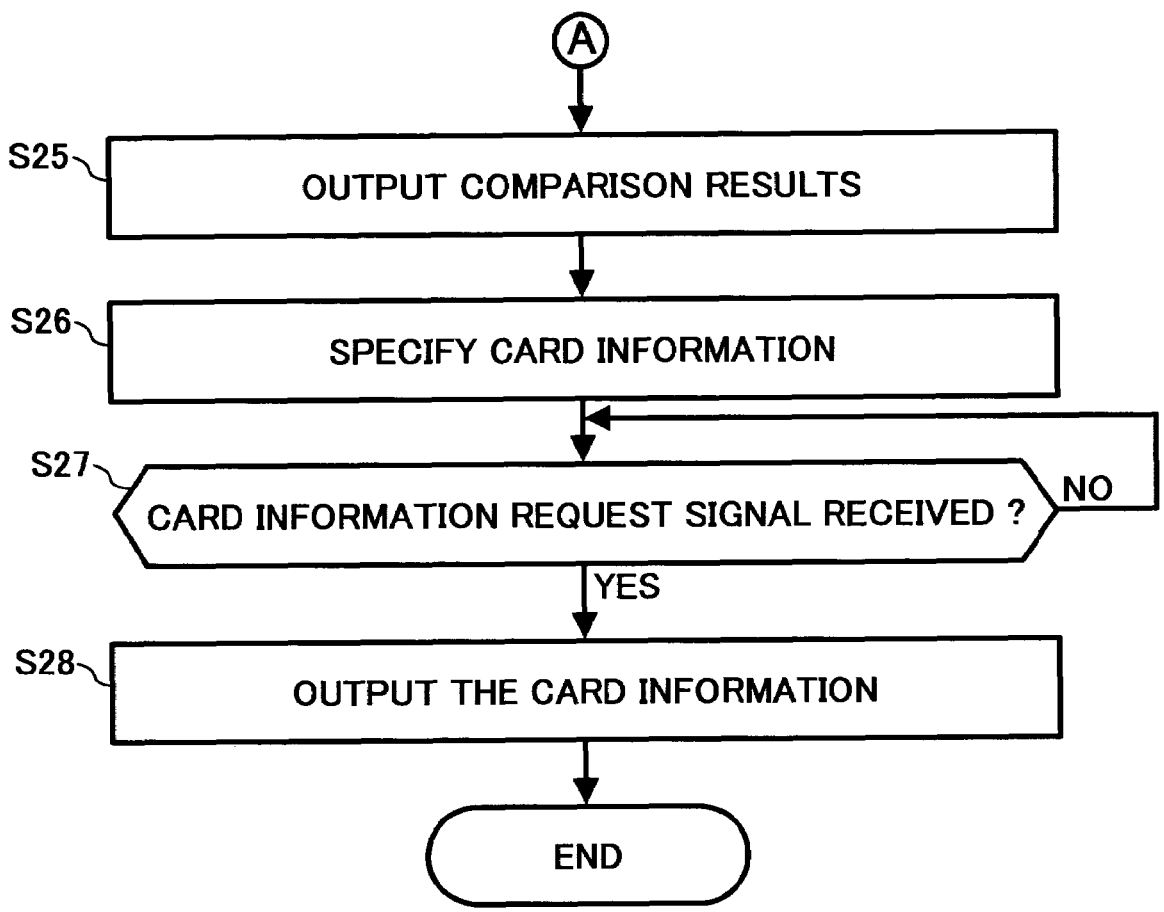

FIG. 14A and FIG. 14B illustrate a flowchart of a calculation process executed by the controller 186. The controller 186 waits until electrical potentials of CD2# and CD1#, which are output from the buffers 163 and 166, are changed to a low level (YES in step S20). When the electrical potentials of CD2# and CD1# have been changed to a low level (YES in step S20), the controller 186 judges as that a card has been connected with the connector 190, sends a card detect signal to the CPU 10 (step S21), and thereafter executes the following process. That is, the controller 186 outputs the high-level signal T1 to the P-channel-type MOSFET 179 to output a high-level signal to VS1# for about 1 ms. After 0.8 ms from start of outputting the high-level signal to VS1#, the controller 189 outputs the latch signal L1# to the latch terminal 180a of the first register 180, to cause data of CD2#, CD1#, VS2# and VS1#, which are output from the buffers 163, 166, 174 and 178 at this time, to be held in the first register 180 (step S22).

Then, the controller 186 outputs the high-level signal T2 to the P-channel-type MOSFET 175 to output a high-level signal to VS2# for about 1 ms. After 0.8 ms from start of outputting the high-level signal to VS2#, the controller 189 outputs the latch signal L2# to the latch terminal 181a of the second register 181 to cause data of CD2#, CD1#, VS2# and VS1#, which are output from the buffers 163, 166, 174 and 178 at this time, to be held in the second register 181 (step S23).

Next, the controller 186 compares 8-bit data (4 bits+4 bits) held in the first register 180 and the second register 181 with 8-bit data of an expansion card stored in the expansion card register 182 and pieces of 8-bit data of 12 types of PC cards stored in the card table 183 (step S24). The controller 186 outputs comparison results with respect to 13 cards in total to the PCMCIA controller 120 (step S25). Further, with respect to a card among the 13 cards, the 8-bit data of which stored in the expansion card register 182 or the card table 183 has agreed with 8-bit data held in the first register 180 and the second register 181, the controller 189 reads out card information (6-bit data) of the card from the card information memory 189, to be specified (step S26). Thereafter, the controller 196 waits for a card information request signal from the CPU 10 (NO in step S27). If a card information request signal is received (YES in step S27), the controller 189 outputs the card information specified in step S26 to the CPU 10 (step S28), and ends the process.

With provision of the PC card identifying part 160a configured as described above to the PC card control device 100, the PC card control device 100 can be simplified in the circuit configuration and be made relatively small in size.

Figure 15:
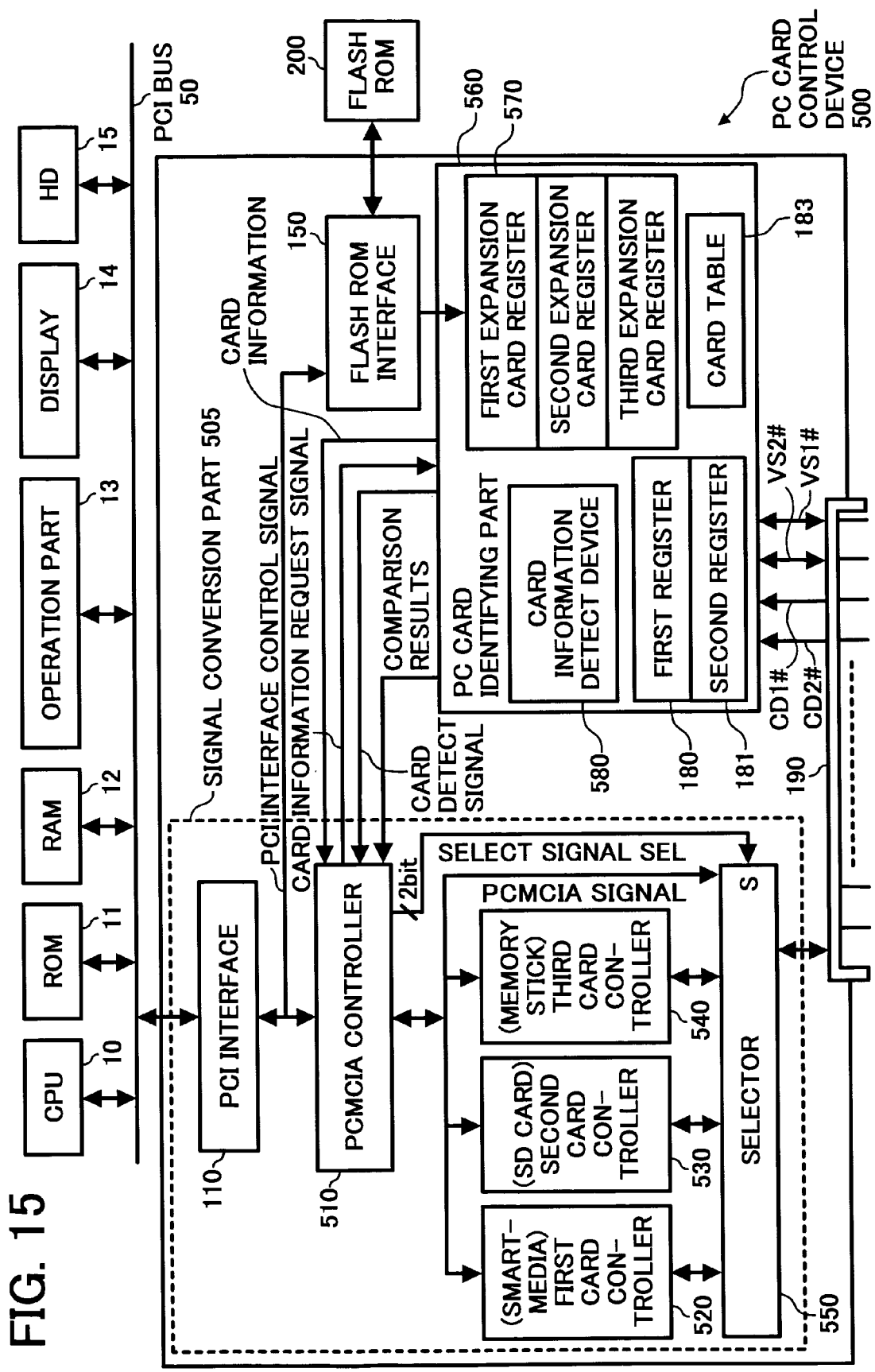
FIG. 15 is a diagram illustrating a PC card control device according to another preferred embodiment of the present invention.

FIG. 15 illustrates a PC card control device 500 according to another preferred embodiment of the present invention.

The PC card control device 100 of the previous embodiment is configured to identify only one type of an expansion card. In contrast, the PC card control device 500 is configured to identify 3 types of expansion cards.

More specifically, as apparent when compared with the PC card control device 100 illustrated in FIG. 1, a signal conversion part 505, which corresponds to the signal conversion part 105 of the PC card control device 100, includes a first card controller 520, a second card controller 530, and a third card controller 540 between a PCMCIA controller 510 and a selector 550. Here, the first card controller 520 is provided for "SmartMedia" (a trademark of Toshiba Corporation) cards, the second card controller 530 is provided for SD Cards, and the fourth card controller 540 is provided for "Memory Stick" (a trademark of Sony Corporation) cards. As described later, the PCMCIA controller 510 generates a 2-bit select signal SEL based upon comparison results of a PC card identifying part 560. Based upon the 2-bit select signal SEL, the selector 550 connects the PCMCIA controller 510 and the connector 190 directly or via the first card controller 520, the second card controller 530, or the third card controller 540.

The PC card identifying part 560 compares 8-bit data (identification information) of the first register 180 and the second register 181, which is obtained from a card connected with the connector 190 as in the PC card control device 100, with pieces of 8-bit data (identification information) of 3 types of expansion cards stored in an expansion card register 570 and pieces of 8-bit data (identification information) of 12 types of PC cards stored in the card table 183, and outputs comparison results to the PCMCIA controller 510. Further, the PC card identifying part 560 specifies 6-bit data (card information) representing the type of the connected card, and outputs the 6-bit data to the CPU 10 via the PCMCIA controller 510, the PCI interface 110 and the PCI bus 50.

The CPU 10 executes processes that are substantially the same as those of the first and second control programs of the PC card control device 100 described above with reference to FIG. 10 and FIG. 12, except that pieces of data of 3 types of expansion cards are received in the process of accepting input of new data of the first register, the second register and card information in step S3 of the first control program illustrated in FIG. 10.

Figures 16, 16A:
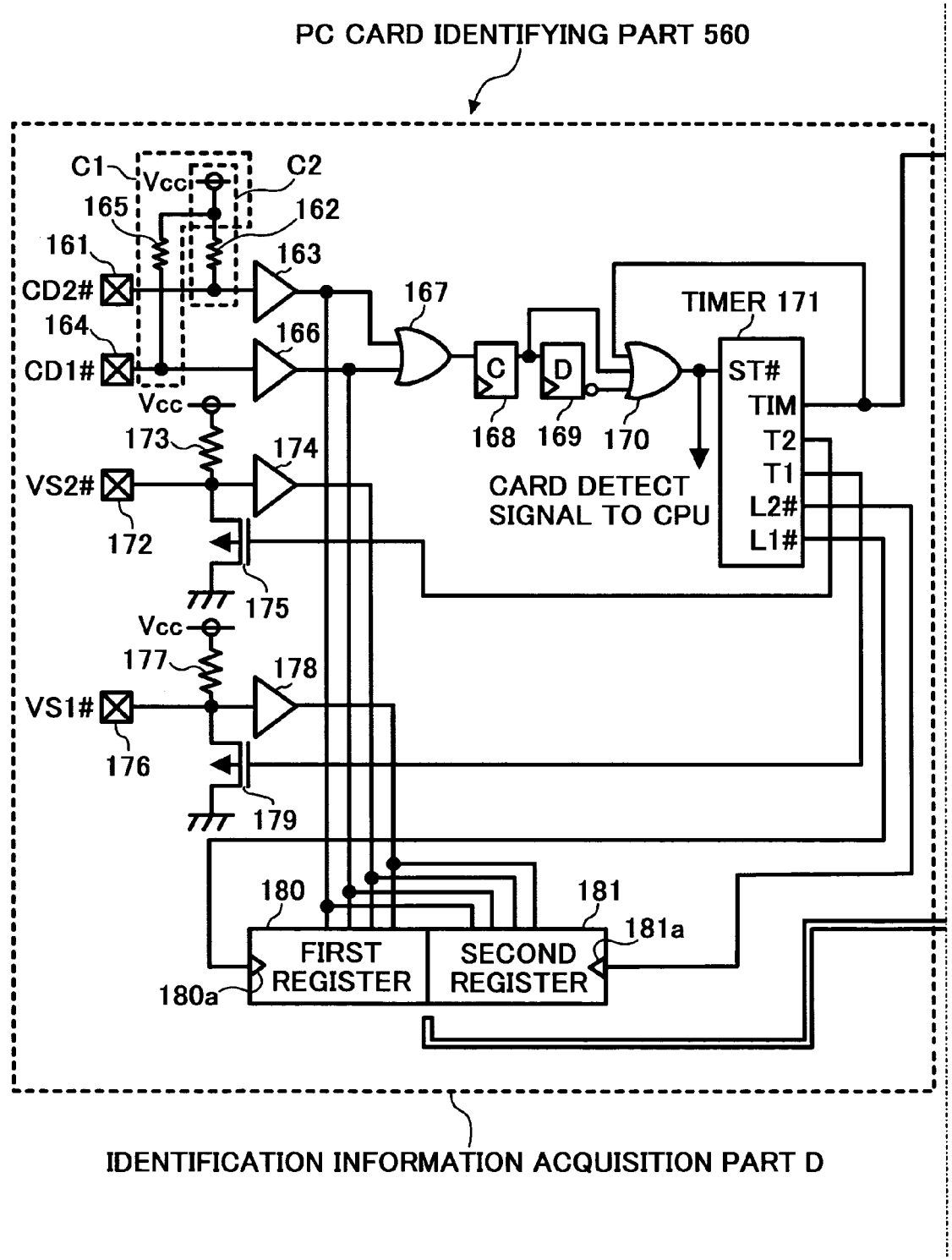
FIG. 16A and FIG. 16B are diagrams illustrating an exemplary configuration of a PC card identifying part of the PC card control device of FIG. 15.
Figure 16B:
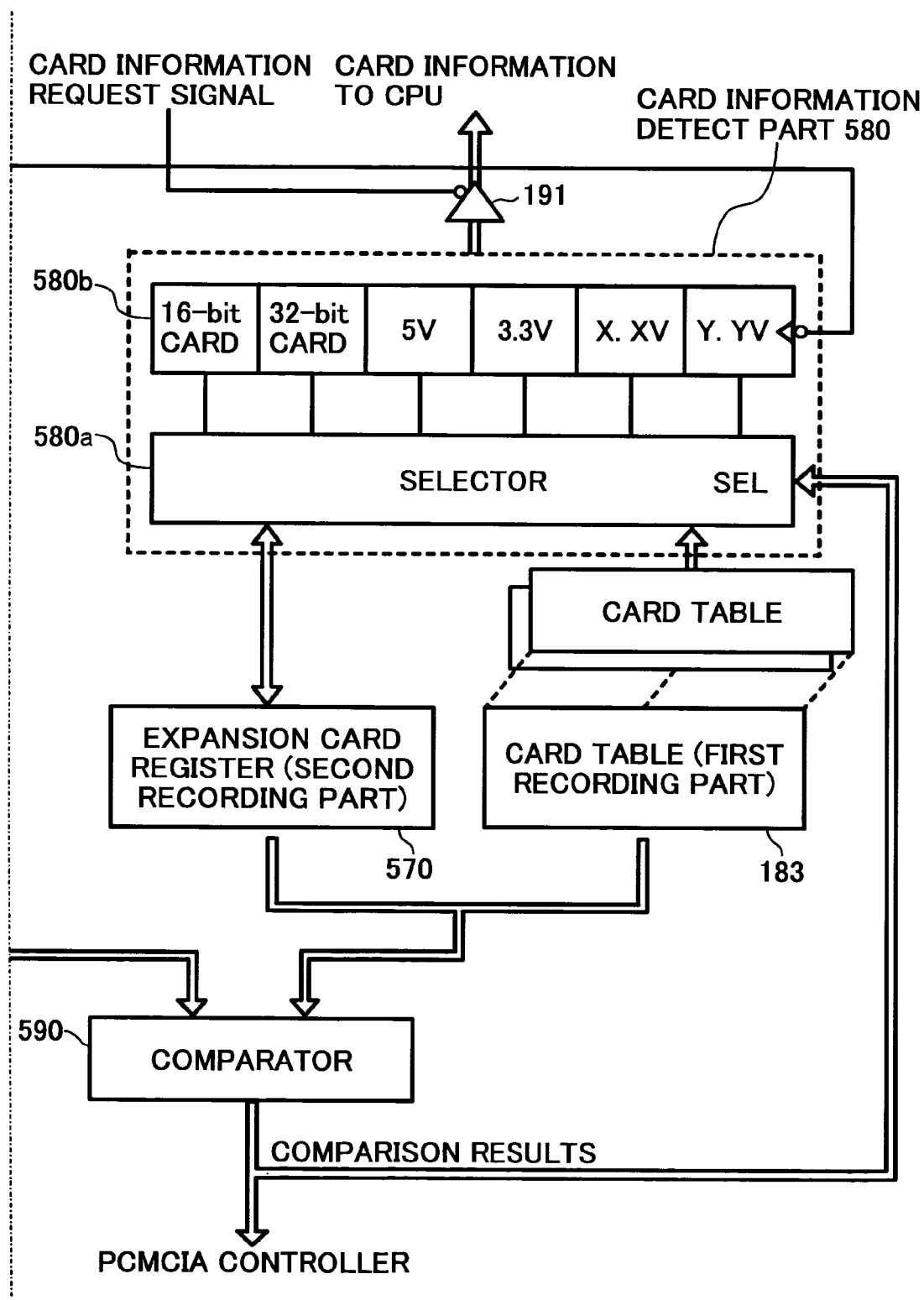

FIG. 16A and FIG. 16B illustrates a configuration of the PC card identifying part 560. Parts of the PC card identifying part 560 that are identical or corresponding to those of the PC card identifying part 160 of the PC card control device 100 of the previous embodiment are denoted by same reference numerals and description thereof is omitted. A comparator 590 compares 8-bit data (identification information) stored in the first register 180 and the second register 181 with pieces of 8-bit data (identification information) of 3 types of expansion cards stored in the expansion card register 570 and pieces of 8-bit data (identification information) of 12 types of PC cards stored in the card table 183 in parallel and simultaneously, and outputs comparison results to the PCMCIA controller 510 and to a card information detect part 580.

The card information detect part 580 includes a selector 580a, and a register 580b for 6 bits. Pieces of 6-bit data of 15 cards in total, each specifying the type of each card (the bit width of the bus and the driving voltage), stored in the expansion card register 570 (for 3 cards) and the card table 183 (for 12 cards), are input into the selector 580a in parallel. The selector 580a outputs, with respect to a card among the 15 cards, for which a high-level comparison result signal has been output from the comparator 590, the 6-bit data representing the type of the card to the register 580b. An inverted signal of the signal TIM is input into an enable terminal of the register 580b. After the timer 171 has output the pulse signal L2#, and CD2#, CD1#, VS1# and VS2# have been stored in the second register 181, at the same time when the electrical potential of the signal TIM changes to a low-level state, the register 580b stores the 6-bit data which has been output from the selector 580a as card information of the card connected with the connector 190.

The 6-bit data latched by the register 580b represents, in order from a most significant bit, whether or not the card connected with the connector 190 is a 16-bit card, whether or not the card is a 32-bit card, whether or not the driving voltage is 5V, whether or not the driving voltage is 3.3V, whether or not the driving voltage is X.XV, and whether or not the driving voltage is Y.YV, and each bit is set to "1" when the card falls under the corresponding category and to "0" when the card does not fall under the corresponding category.

The register 580b outputs the latched 6-bit data to the 3-state buffer 191. The 3-state buffer 191 outputs, in response to a low-level card information request signal from the CPU 10, the 6-bit data to the CPU 10, via the PCMCIA controller 510, the PCI interface 110, and the PCI bus, as data (card information) representing the type of a card connected with the connector 190. The CPU 10 exchanges data with the card connected with connector 190 based upon content of the received 6-bit data (card information).

FIG. 17 illustrates a configuration of a part of the PCMCIA controller 510. As illustrated in figure, among comparison results which are input from the PC card identifying part 560, the PCMCIA controller 510 outputs a comparison result of 8-bit data (identification information) stored in the first register 180 (4 bits) and the second register 181 (4 bits) and pieces of 8-bit data (identification information) of 3 types of expansion cards stored in the expansion card register 570 as a 2-bit select signal SEL, using two OR gates 511 and 512. Specifically, the PCMCIA controller 510 obtains a logical sum of 1-bit data of a comparison result with respect to the first piece of the 3 types of expansion cards, data of which is stored in the first expansion card register of the expansion card register 570 (see FIG. 15), and 1-bit data of a comparison result with respect to the third piece of the 3 types of expansion cards, data of which is stored in the second expansion card register of the expansion card register 570, by the OR gate 512, and outputs an output of the OR gate 512 as data of a lower bit of the 2-bit select signal SEL. Further, the PCMCIA controller 510 obtains a logical sum of 1-bit data of a comparison result with respect to the second piece of the 3 types of expansion cards, data of which is stored in the third expansion card register of the expansion card register 570, and the 1-bit data with respect to the third piece of the 3 types of expansion cards by the OR gate 511, and outputs an output of the OR gate 511 as data of an upper bit of the 2-bit select signal SEL. That is, when 8-bit data stored in the first register 180 and the second register 181 agrees with any of the pieces of 8-bit data stored in the expansion card register 570, a high-level select signal SEL is output, and when 8-bit data stored in the first register 180 and the second register 181 does not agree with any of the pieces of 8-bit data stored in the expansion card register 570, a low-level select signal SEL is output.

Now, referring back to FIG. 15, when the selector 550 has received a select signal SEL of "00" from the PCMCIA controller 510, the selector 550 judges as that a connected card is a PC card conforming to the PCMCIA standard, and directly connects the PCMCIA controller 510 and the connector 190. When the selector 550 has received a select signal SEL of "01" from the PCMCIA controller 510, the selector 550 judges as that a connected card is a SmartMedia card, and connects the first card controller 520 and the connector 190. The PCMCIA controller 510 can recognize the SmartMedia card via the first card controller 520. Similarly, when the selector 550 has received a select signal of "10" or "11" from the PCMCIA controller 510, the selector 550 judges as that a connected card is an SD Card or a Memory Stick card, and connects the second card controller 530 or the third card controller 540 and the connector 190. The PCMCIA controller 510 can recognize the SD Card or the Memory Stick card via the second card controller 530 or the third card controller 540.

As described above, the PC card controller devices 100 and 500 of the present invention can recognize new types of expansion cards using a known card identification method based upon the PCMCIA standard without providing any special card identification algorithm. Further, when a change is made in expansion cards previously registered (e.g., the driving voltage is changed from 5V to 3.3V), such a change can be easily incorporated into the flash ROM 200 by rewriting the content of the flash ROM 200.

In the above-described PC card control devices 100 and 500, for values of 8-bit data of the first register and the second register to be set in the expansion card register 182 or 570, combination patterns of 4-bit data illustrated in FIG. 6A and FIG. 6B, which are not defined in the PCMCIA standard, are used. However, it may configured such that combination patterns of 4-bit data of cards NO. 5 and NO. 9 in the card table 183 illustrated in FIG. 5A through FIG. 5D, for which types of the cards are not defined, are also used. Further, it may be configured such that, types of cards with respect to cards other than cards No. 5 and NO. 9, that are already defined, can be redefined. In these cases, it may occur that a card connected with the connector 190 is identified as one of the 12 types of PC cards defined by the card table 183 and also as one of the expansion cards, pieces of 8-bit data of which are stored in the expansion card register 182 or 570 may be detected. Therefore, in these cases, a select signal SEL is generated only based upon a comparison result with respect to the pieces of 8-bit data from the expansion card register 182 or 570 as executed by the PCMCIA controller 120 of the PC card control device 100.

The processes and mechanisms set forth in the present description may be implemented using a conventional general purpose microprocessor programmed according to the teachings in the present specifications, as will be appreciated to those skilled in the relevant arts. Appropriate software coding can be readily prepared by skilled programmers based upon the teachings of the present disclosure, as will also be apparent to those skilled in the relevant arts.

The present invention thus includes a computer program product which may be hosted on a storage medium and includes computer program instructions, which, when loaded into a computer and executed by the computer perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention can be practiced otherwise than as specifically described herein.

What is claimed is:

1. A PC card control device, comprising:
   a connector; and
   a PC card identifying part configured to identify a type of a card connected with the connector, the PC card identifying part including, an identification information acquisition part configured to acquire identification information of the connected card from the connected card with a method conforming to a standard;

a first recording part recording pieces of first card information and pieces of first identification information of one or more types of PC cards conforming to the standard; and a second recording part recording pieces of second card information and pieces of second identification of one or more types of expansion cards not conforming to the standard, wherein the PC card identifying part identifies the type of the connected card based upon the identification information of the connected card acquired by the identification information acquisition part and at least the pieces of second identification information recorded in the second recording part, and to output a result of identifying the type of the connected card and card information of the connected card.

2. The PC card control device according to claim 1, further comprising:

a signal conversion part configured to establish a circuit line to exchange signals with the connected card based upon the result of identifying the type of the connected card which has been output from the PC card identifying part.

3. The PC card control device according to claim 1, wherein the standard is a PCMCIA standard; and wherein the pieces of second identification information recorded in the second recording part are pieces of information that are acquired by the identification information acquisition part when PC cards conforming to the PCMCIA standard are connected with the PC card control device, respectively, from the connected PC cards with the method conforming to the PCMCIA standard, first and second card detect signal lines and first and second voltage select lines of each of the PC cards being connected with each other as in any of following cases: a case (1), wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, a case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

4. A PC card control device comprising:

a PC card identifying part configured to identify a type of a card connected with the PC card control device, the PC card identifying part including, an identification information acquisition part configured to acquire identification information of the connected card from the connected card, a first recording part recording pieces of first card information of one or more types of PC cards conforming to a standard, and pieces of first identification information of the one or more types of PC cards to be acquired by the identification information acquisition part when the one or more types of PC cards are connected with the PC card control device, respectively, and a second recording part recording pieces of second card information of one or more types of expansion cards not conforming to the standard, and pieces of second identification information of the one or more types of expansion cards to be acquired by the identification information acquisition part when the one or more types of expansion cards are connected with the PC card control device, respectively, and wherein the PC card identifying part identifies the type of the connected card based upon the identification information of the connected card acquired by the identification information acquisition part and at least the pieces of second identification information recorded in the second recording part, and to output a result of identifying the type of the connected card and card information of the connected card; and a signal conversion part configured to establish a circuit line to exchange signals with the connected card based upon the result of identifying the type of the connected card which been output from the PC card identifying part, wherein the pieces of second card information and the pieces of second identification information of the one or more types of expansion cards recorded in the second recording part can be updated from the outside.

5. The PC card control device according to claim 4, wherein the standard is a PCMCIA standard.

6. The PC card control device according to claim 5, wherein the pieces of second identification information recorded in the second recording part are pieces of information that are acquired by the identification information acquisition part when PC cards conforming to the PCMCIA standard are connected with the PC card control device, respectively, from the connected PC cards with the method conforming to the PCMCIA standard, first and second card detect signal lines and first and second voltage select lines of each of the PC cards being connected with each other as in any of following cases: a case (1) wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, a case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

7. A computer system comprising:

a PC card control device comprising;

a PC card identifying part configured to identify a type of a card connected with the PC card control device, the PC card identifying part including an identification information acquisition part configured to acquire identification information of the connected card from the connected card, a first recording part recording pieces of first card information of one or more types of PC cards conforming to a standard, and pieces of first identification information of the one or more types of PC cards to be acquired by the identification information acquisition part when each of the one or more types of PC cards is connected with the PC card control device, and a second recording part recording pieces of second card information of one or more types of expansion cards not conforming to the standard, and pieces of second identification information of the one or more types of expansion cards to be acquired by the identification information acquisition part when each of the one or more types of expansion card is connected with the PC card control device, wherein the PC card identifying part identifies the type of the connected card based upon the identification information of the connected card acquired by the identification information acquisition part and at least the pieces of second identification information recorded in the second recording part, and outputs a result of identifying the type of the connected card and card information of the connected card; and a signal conversion part configured to establish a circuit line to exchange signals with the connected card based upon the result of identifying the type of the connected card which has been output from the PC card identifying part, wherein the pieces of second card information and the pieces of second identification information of the one or more types of expansion cards recorded in the second recording part can be updated from the outside; and a recognition device configured to recognize the type of the connected card based upon the card information of the connected card which has been output by the PC card identifying part of the PC card control device.

8. A computer system comprising:

a PC card control device comprising;

a PC card identifying part configured to identify a type of a card connected with the PC card control device, the PC card identifying part including an identification information acquisition part configured to acquire identification information of the connected card from the connected card, a first recording part recording pieces of first card information of one or more types of PC cards conforming to a standard, and pieces of first identification information of the one or more types of PC cards to be acquired by the identification information acquisition part when the one or more types of PC cards are connected with the PC card control device, respectively, and a second recording part recording pieces of second card information of one or more types of expansion cards not conforming to the standard, and pieces of second identification information of the one or more types of expansion cards to be acquired by the identification information acquisition part when the one or more types of expansion cards are connected with the PC card control device, respectively, wherein the PC card identifying part identifies the type of the connected card based upon the identification information of the connected card acquired by the identification information acquisition part and at least the pieces of second identification information recorded in the second recording part, and to output a result of identifying the type of the connected card and card information of the connected card; and a signal conversion part configured to establish a circuit line to exchange signals with the connected card based upon the result of identifying the type of the connected card which been output from the PC card identifying part, wherein the pieces of second card information and the pieces of second identification information of the one or more types of expansion cards recorded in the second recording part can be updated from the outside; and a data updating device configured to update the pieces of second card information and the pieces of second identification information of the one or more types of expansion cards recorded in the second recording part of the PC card control device.

9. A PC card control device, comprising:

an identification information acquisition part configured to acquire identification information of a card connected with the PC card control device from the connected card with a method conforming to a standard;

a first recording part recording pieces of first card information and pieces of first identification information of one or more types of PC cards conforming to the standard;

a second recording part recording pieces of second card information and pieces of second identification information of one or more types of expansion cards not conforming to the standard;

a card identifying device configured to identify a type of the connected card based upon the identification information of the connected card acquired by the identification information acquisition part and at least the pieces of second identification information recorded in the second recording part, and to output a result of identifying the type of the connected card; and a card information detect part configured to detect card information of the connected card based upon the result of identifying the type of the connected card by the card identifying device.

10. The PC card control device according to claim 9, further comprising:

a signal conversion part configured to establish a circuit line to exchange signals with the connected card based upon the result of identifying the type of the connected card which has been output from the card identifying device.

11. The PC card control device according to claim 9, wherein the pieces of second card information and the pieces of second identification information of the one or more types of expansion cards recorded in the second recording part can be updated from the outside.

12. The PC card control device according to claim 9, wherein the standard is a PCMCIA standard.

13. The PC card control device according to claim 12, wherein the pieces of second identification information recorded in the second recording part are pieces of information that are acquired by the identification information acquisition part when PC cards conforming to the PCMCIA standard are connected with the PC card control device, respectively, from the connected PC cards with the method conforming to the PCMCIA standard, first and second card detect signal lines and first and second voltage select lines of each of the PC cards being connected with each other as in any of following cases: a case (1) wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, a case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

14. A computer system comprising:
a PC card control device including;
an identification information acquisition part configured to acquire identification information of a card connected with the PC card control device from the connected card with a method conforming to a standard,
a first recording part recording pieces of first card information and pieces of first identification information of one or more types of PC cards conforming to the standard,
a second recording part recording pieces of second card information and pieces of second identification information of one or more types of expansion cards not conforming to the standard,
a card identifying device configured to identify a type of the connected card based upon the identification information of the connected card acquired by the identification information acquisition part and at least the pieces of second identification information recorded in the second recording part, and to output a result of identifying the type of the connected card, and
a card information detect part configured to detect card information of the connected card based upon the result of identifying the type of the connected card by the card identifying device; and
a recognition device configured to recognize the type of the connected card based upon the card information of the connected card which has been output by the PC card identifying part of the PC card control device.

15. A computer system comprising:
a PC card control device including;
an identification information acquisition part configured to acquire identification information of a card connected with the PC card control device from the connected card with a method conforming to a standard,
a first recording part recording pieces of first card information and pieces of first identification information of one or more types of PC cards conforming to the standard,
a second recording part recording pieces of second card information and pieces of second identification information of one or more types of expansion cards not conforming to the standard,
a card identifying device configured to identify a type of the connected card based upon the identification information of the connected card acquired by the identification information acquisition part and at least the pieces of second identification information recorded in the second recording part, and to output a result of identifying the type of the connected card, and
a card information detect part configured to detect card information of the connected card based upon the result of identifying the type of the connected card by the card identifying device; and
a data updating device configured to update the pieces of second card information and the pieces of second identification information of the one or more types of expansion cards recorded in the second recording part of the PC card control device.

16. A PC card control device, comprising:
a connector; and
PC card identifying means for identifying a type of a card connected with the connector, the PC card identifying means including,
identification information acquiring means for acquiring identification information of the connected card from the connected card with a method conforming to a standard;
first recording means for recording pieces of first card information and pieces of first identification information of one or more types of PC cards conforming to the standard; and
second recording means for recording pieces of second card information and pieces of second identification of one or more types of expansion cards not conforming to the standard,
wherein the PC card identifying means identifies the type of the connected card based upon the identification information of the connected card acquired by the identification information acquiring means and at least the pieces of second identification information recorded in the second recording means, and to output a result of identifying the type of the connected card and card information of the connected card.

17. The PC card control device according to claim 16, further comprising:
signal conversion means for establishing a circuit line to exchange signals with the connected card based upon the result of identifying the type of the connected card which has been output from the PC card identifying means.

18. A PC card control device comprising:
PC card identifying means for identifying a type of a card connected with the PC card control device, the PC card identifying means including,
identification information acquiring means for acquiring identification information of the connected card from the connected card,
first recording means for recording pieces of first card information of one or more types of PC cards conforming to a standard, and pieces of first identification information of the one or more types of PC cards to be acquired by the identification information acquiring means when the one or more types of PC cards are connected with the PC card control device, respectively, and
second recording means for recording pieces of second card information of one or more types of expansion cards not conforming to the standard, and pieces of second identification information of the one or more types of expansion cards to be acquired by the identification information acquiring means when the one or more types of expansion cards are connected with the PC card control device, respectively, and
wherein the PC card identifying means identifies the type of the connected card based upon the identification information of the connected card acquired by the identification information acquiring means and at least the pieces of second identification information recorded in the second recording means, and to output a result of identifying the type of the connected card and card information of the connected card; and signal conversion means for establishing a circuit line to exchange signals with the connected card based upon the result of identifying the type of the connected card which been output from the PC card identifying means, wherein the pieces of second card information and the pieces of second identification information of the one or more types of expansion cards recorded in the second recording means can be updated from the outside.

19. A computer system comprising:

a PC card control device comprising;

PC card identifying means for identifying a type of a card connected with the PC card control device, the PC card identifying means including identification information acquiring means for acquiring identification information of the connected card from the connected card, first recording means for recording pieces of first card information of one or more types of PC cards conforming to a standard, and pieces of first identification information of the one or more types of PC cards to be acquired by the identification information acquiring means when each of the one or more types of PC cards is connected with the PC card control device, and second recording means for recording pieces of second card information of one or more types of expansion cards not conforming to the standard, and pieces of second identification information of the one or more types of expansion cards to be acquired by the identification information acquiring means when each of the one or more types of expansion card is connected with the PC card control device, wherein the PC card identifying means identifies the type of the connected card based upon the identification information of the connected card acquired by the identification information acquiring means and at least the pieces of second identification information recorded in the second recording means, and outputs a result of identifying the type of the connected card and card information of the connected card; and signal conversion means for establishing a circuit line to exchange signals with the connected card bused upon the result of identifying the type of the connected card which has been output from the PC card identifying means, wherein the pieces of second card information and the pieces of second identification information of the one or more types of expansion cards recorded in the second recording means can be updated from the outside; and recognition means for recognizing the type of the connected card based upon the card information of the connected card which has been output by the PC card identifying means of the PC card control device.

20. A computer system comprising:

a PC card control device comprising;

PC card identifying means for identifying a type of a card connected with the PC card control device, the PC card identifying means including identification information acquiring means for acquiring identification information of the connected card from the connected card, first recording means for recording pieces of first card information of one or more types of PC cards conforming to a standard, and pieces of first identification information of the one or more types of PC cards to be acquired by the identification information acquiring means when the one or more types of PC cards are connected with the PC card control device, respectively, and second recording means for recording pieces of second card information of one or more types of expansion cards not conforming to the standard, and pieces of second identification information of the one or more types of expansion cards to be acquired by the identification information acquiring means when the one or more types of expansion cards are connected with the PC card control device, respectively, wherein the PC card identifying means identifies the type of the connected card based upon the identification information of the connected card acquired by the identification information acquiring means and at least the pieces of second identification information recorded in the second recording means, and to output a result of identifying the type of the connected card and card information of the connected card; and signal conversion means for establish a circuit line to exchange signals with the connected card based upon the result of identifying the type of the connected card which been output from the PC card identifying means, wherein the pieces of second card information and the pieces of second identification information of the one or more types of expansion cards recorded in the second recording means can be updated from the outside; and data updating means for update the pieces of second card information and the pieces of second identification information of the one or more types of expansion cards recorded in the second recording means of the PC card control device.

21. A PC card control device, comprising:

identification information acquiring means for acquiring identification information of a card connected with the PC card control device from the connected card with a method conforming to a standard;

first recording means for recording pieces of first card information and pieces of first identification information of one or more types of PC cards conforming to the standard;

second recording means for recording pieces of second card information and pieces of second identification information of one or more types of expansion cards not conforming to the standard;

identifying means for identifying a type of the connected card based upon the identification information of the connected card acquired by the identification information acquiring means and at least the pieces of second identification information recorded in the second recording means, and to output a result of identifying the type of the connected card; and card information detecting means for detecting card information of the connected card based upon the result of identifying the type or the connected card by the card identifying means.

22. The PC card control device according to claim 21, further comprising:

signal conversion means for establishing a circuit line to exchange signals with the connected card based upon the result of identifying the type of the connected card which has been output from the card identifying means.

23. A computer system comprising:

a PC card control device including;

identification information acquiring means for acquiring identification information of a card connected with the PC card control device from the connected card with a method conforming to a standard, first recording means for recording pieces of first card information and pieces of first identification information of one or more types of PC cards conforming to the standard, second recording means for recording pieces of second card information and pieces of second identification information of one or more types of expansion cards not conforming to the standard, card identifying means for identify a type of the connected card based upon the identification information of the connected card acquired by the identification information acquiring means and at least the pieces of second identification information recorded in the second recording means, and to output a result of identifying the type of the connected card, and card information detect means for detecting card information of the connected card based upon the result of identifying the type of the connected card by the card identifying means; and recognition means for recognizing the type of the connected card based upon the card information of the connected card which has been output by the PC card identifying means of the PC card control device.

24. A computer system comprising:
a PC card control device including;
identification information acquiring means for acquiring identification information of a card connected with the PC card control device from the connected card with a method conforming to a standard, first recording means for recording pieces of first card information and pieces of first identification information of one or more types of PC cards conforming to the standard, second recording means for recording pieces of second card information and pieces of second identification information of one or more types of expansion cards not conforming to the standard, card identifying means for identifying a type of the connected card based upon the identification information of the connected card acquired by the identification information acquiring means and at least the pieces of second identification information recorded in the second recording means, and to output a result of identifying the type of the connected card, and card information detect means for detecting card information of the connected card based upon the result of identifying the type of the connected card by the card identifying means; and data updating means for updating the pieces of second card information and the pieces of second identification information of the one or more types of expansion cards recorded in the second recording means of the PC card control device.

25. A PC card identifying method of identifying a type of a card connected with a PC card control device, comprising:
identifying the type of the connected card based upon 1) identification information of the connected card, which is acquired from the connected card by an identification information acquisition device of the PC card control device, and 2), among pieces of card information and pieces of identification information of one or more types of PC cards conforming to a standard and one or more types of expansion cards, which are stored in advance in a recording part of the PC card control device, the pieces of identification information being acquired by the identification information acquisition device when the one or more types of PC cards and the one or more types of expansion cards have been connected with the PC card control device, respectively, at least the pieces of identification information of the one or more types of expansion cards, and outputting a result of identifying the type of the connected card; and establishing a circuit line to exchange signals with the connected card based upon the result of identifying the type of the connected card, wherein the pieces of card information and the pieces of identification information of the one or more types of expansion cards have been inputted from the outside to be stored in the recording part of the PC card control device.

26. A PC card identifying method of identifying a type of a card connected with a PC card control device, comprising:
storing pieces of card information and pieces of identification information of one or more types of PC cards conforming to a standard and one or more types of expansion cards not conforming to the standard in advance in the PC card control device;

acquiring identification information of the connected card from the connected card with a method conforming to the standard; and identifying the type of the connected card based upon the identification information of the connected card acquired from the connected card and at least the pieces of identification information of the one or more types of expansion cards not conforming to the standard, and outputting a result of identifying the type of the connected card.

27. The PC card identifying method according to claim 26, further comprising:
establishing a circuit line to exchange signals with the connected card based upon the result of identifying the type of the connected card.

28. The PC card identifying method according to claim 26, wherein in the storing step, the pieces of card information and the pieces of identification information of the one or more types of expansion cards are inputted from the outside to be stored in the PC card control device.

29. The PC card identifying method according to claim 26 further comprising:
updating the pieces of card information and the pieces of identification information of the one or more types of expansion cards from the outside.

30. The PC card identifying method according to claim 26, wherein the standard is a PCMCIA standard.

31. The PC card identifying method according to claim 30, wherein the pieces of identification information of the one or more types of expansion cards stored in the PC card control device in the storing step are pieces of information that are acquired when PC cards conforming to the PCMCIA standard are connected with the PC control device, respectively, from the connected PC cards with the method conforming to the PCMCIA standard, first and second card detect signal lines and first and second voltage select lines of each of the PC cards being connected with each other as in any of following cases: a case (1) wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

32. A computer readable storage medium embodying computer program instructions which when executed by a computer cause a PC card control device to perform a method for identifying a type of a card connected with the PC card control device, the method comprising:

identifying the type of the connected card based upon 1) card information and identification information of one or more types of PC cards conforming to a standard and one or more types of expansion cards, which are stored in advance in a recording part of the PC card control device, and 2) identification information of the connected card which are acquired by the PC card control device from the connected card when the one or more types of PC cards and the one or more types of expansion cards have been connected with the PC card control device and outputting a result of identifying the type of the connected card; and exchanging signals through a signal line between the PC card control device and the connected card based upon the result of identifying the type of the connected card.

33. A computer readable storage medium embodying computer program instructions which when executed by a computer cause a PC card control device to perform a method for identifying a type of a card connected with the PC card control device, the method comprising:

storing card information and identification information of one or more types of PC cards and one or more types of expansion cards in advance in the PC card control device;

acquiring identification information of the connected card from the connected card; and identifying the type of the connected card based upon the identification information of the connected card acquired from the connected card and at least the identification information of the one or more types of expansion cards and outputting a result of identifying the type of the connected card.

34. The computer readable storage medium according to claim 33, the PC card identifying operation further comprising:

establishing a circuit line to exchange signals with the connected card based upon the result of identifying the type of the connected card.

35. The computer readable storage medium according to claim 33, wherein in the storing step, the pieces of card information and the pieces of identification information of the one or more types of expansion cards are inputted from the outside to be stored in the PC card control device.

36. The computer readable storage medium according to claim 33, the PC card identifying operation further comprising:

updating the pieces of card information and the pieces of identification information of the one or more types of expansion cards from the outside.

37. The computer readable storage medium according to claim 33, wherein the standard is a PCMCIA standard.

38. The computer readable storage medium according to claim 37, wherein the pieces of identification information of the one or more types of expansion cards stored in the PC card control device in the storing step are pieces of information that are acquired when PC cards conforming to the PCMCIA standard are connected with the PC control device, respectively, from the connected PC cards with the method conforming to the PCMCIA standard, first and second card detect signal lines and first and second voltage select lines of each of the PC cards being connected with each other as in any of following cases: a case (1) wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, a case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

39. A computer readable storage medium storing computer program instructions which when executed by a computer cause a PC card control device to perform a PC card identifying operation of identifying a type of a card connected with the PC card control device, the PC card identifying operation comprising:

identifying the type of the connected card based upon 1) identification information of the connected card, which is acquired from the connected card by an identification information acquisition device of the PC card control device, and 2), among pieces of card information and pieces of identification information of one or more types of PC cards conforming to a standard and one or more types of expansion cards, which are stored in advance in a recording part of the PC card control device, the pieces of identification information being acquired by the identification information acquisition device when the one or more types of PC cards and the one or more types of expansion cards have been connected with the PC card control device, respectively, at least the pieces of identification information of the one or more types of expansion cards, and outputting a result of identifying the type of the connected card; and establishing a circuit line to exchange signals with the connected card based upon the result of identifying the type of the connected card, wherein the pieces of card information and the pieces of identification information of the one or more types of expansion cards have been inputted from the outside to be stored in the recording part of the PC card control device.

40. A computer readable storage medium storing computer program instructions which when executed by a computer cause a PC card control device to perform a PC card identifying operation of identifying a type of a card connected with the PC card control device, the PC card control operation comprising:

storing pieces of card information and pieces of identification information of one or more types of PC cards conforming in a standard and one or more types of expansion cards not conforming to the standard in advance in the PC card control device;

acquiring identification information of the connected card from the connected card with a method conforming to the standard; and identifying the type of the connected card based upon the identification information of the connected card acquired from the connected card and at least the pieces of identification information of the one or more types of expansion cards not conforming to the standard, and outputting a result of identifying the type of the connected card.

41. The computer readable storage medium according to claim 40, the PC card identifying operation further comprising:

establishing a circuit line to exchange signals with the connected card based upon the result of identifying the type of the connected card.

42. The computer readable storage medium according to claim 40, wherein in the storing step, the pieces of card information and the pieces of identification information of the one or more types of expansion cards are inputted from the outside to be stored in the PC card control device.

43. The computer readable storage medium according to claim 40, the PC card identifying operation further comprising:

updating the pieces of card information and the pieces of identification information of the one or more types of expansion cards from the outside.

44. The computer readable storage medium according to claim 40, wherein the standard is a PCMCIA standard.

45. The computer readable storage medium according to claim 44, wherein the pieces of identification information of the one or more types of expansion cards stored in the PC card control device in the storing step are pieces of information that are acquired when PC cards conforming to the PCMCIA standard are connected with the PC control device, respectively, from the connected PC cards with the method conforming to the PCMCIA standard, first and second card detect signal lines and first and second voltage select lines of each of the PC cards being connected with each other as in any of following cases: a case (1) wherein the first card detect signal line is connected with the first voltage select signal line and the second card detect signal line is connected with the second voltage select signal line, a case (2) wherein the first card detect signal line is connected with the second voltage select signal line and the second card detect signal line is connected with the first voltage select signal line, a case (3) wherein the first and second card detect signal lines are connected with the second voltage select signal line and the second voltage select signal line is grounded, a case (4) wherein the first and second card detect signal lines are connected with the first voltage select signal line and the first voltage select signal line is opened, a case (5) wherein the first and second card detect signal lines are connected with the first voltage select signal line and the second voltage select signal line is grounded, and a case (6) wherein the first and second card detect signal lines are connected with the first voltage select signal line and the second voltage select signal line is opened.

* * * * *